US011392437B1

(12) United States Patent
Zhang et al.

(10) Patent No.: US 11,392,437 B1
(45) Date of Patent: Jul. 19, 2022

(54) COLD START AND ADAPTIVE SERVER MONITOR

(71) Applicant: Adobe Inc., San Jose, CA (US)

(72) Inventors: Wei Zhang, Great Falls, VA (US); Christopher John Challis, Alpine, UT (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/158,643

(22) Filed: Jan. 26, 2021

(51) Int. Cl.
    *G06F 11/07* (2006.01)

(52) U.S. Cl.
    CPC ...... *G06F 11/0754* (2013.01); *G06F 11/0709* (2013.01); *G06F 2201/81* (2013.01); *G06F 2201/835* (2013.01)

(58) Field of Classification Search
    CPC ............ G06F 11/0709; G06F 11/0754; G06F 11/079; G06F 11/3447; G06F 11/3452; G06F 2201/81; G06F 2201/835
    USPC ................................................ 714/47.1–47.3
    See application file for complete search history.

(56) References Cited

U.S. PATENT DOCUMENTS

| | | | | |
|---|---|---|---|---|
| 2019/0129821 A1* | 5/2019 | Lee | ................. | G06F 11/3409 |
| 2020/0097381 A1* | 3/2020 | Naohara | ............ | G06F 11/3058 |
| 2020/0341832 A1* | 10/2020 | Poghosyan | ......... | G06K 9/6282 |

OTHER PUBLICATIONS

Bobadilla, et al., "A collaborative filtering approach to mitigate the new user cold start problem," Knowledge-Based Systems, 26 (2012), pp. 225-238.
Nishida, Kan, "An Introduction to Time Series Forecasting with Prophet in Exploratory," (Apr. 12, 2017), accessed from Internet at: https://blog.exploratory.io/an-introduction-to-time-series-forecasting-with-prophet-package-in-exploratory-129ed0c12112, pp. 1-19.
Taylor, Sean J. and Benjamin Letham, "Forecasting at Scale," The American Statistician, (2018), vol. 72, No. 1, pp. 37-45.
Ten, David, "Time Series Forecasting with Prophet," (Sep. 19, 2018), accessed from Internet at: https://xang1234.github.io/prophet/, pp. 1-12.
Abadie et al., "Comparative Politics and the Synthetic Control Method", American Journal of Political Science, vol. 59, No. 2, pp. 495-510 (Apr. 2015).

(Continued)

*Primary Examiner* — Joseph R Kudirka
(74) *Attorney, Agent, or Firm* — Finch & Maloney PLLC

(57) ABSTRACT

A server monitoring methodology uses a time-series model for predicting value of a metric of a server. The model is built using initial training data that includes median values of the metric, each median value based on previously measured values of that metric, from servers of a group to which the server is being added. The methodology includes observing the value of the metric of the server, and comparing that observed value to a predicted value of the model. In response to the observed value being within an expected tolerance, the training data is updated to include the observed value; and in response to the observed value being outside the expected tolerance, the training data is updated to include a value between the observed value of the server metric and the predicted value. The model is updated using the updated training data, and eventually adapts to performance of the server.

20 Claims, 12 Drawing Sheets

(56) References Cited

OTHER PUBLICATIONS

Abadie et al., "Synthetic Control Methods for Comparative Case Studies: Estimating the Effect of California's Tobacco Control Program", Journal of the American Statistical Association, vol. 105, No. 490 (Jun. 2010).
Billmeier et al., "Assessing Economic Liberalization Episodes: A Synthetic Control Approach", The Review of Economics and Statistics, 95(3), pp. 983-1001 (Jul. 2013).
Chen et al., "Differentiating RegularizationWeights—A Simple Mechanism to Alleviate Cold Start in Recommender Systems", ACM Trans. Knowl. Discov. Data 13, 1, article 8 (Jan. 2019).
Elahi et al., "A survey of active learning in collaborative filtering recommender systems", Computer Science Review, vol. 20, pp. 29-50 (May 2016).
Rubens et al., "Active Learning in Recommender Systems", Recommender Systems Handbook, 2nd edition, chapter 24, pp. 809-856 (Feb. 2016).

\* cited by examiner

COLD START AND ADAPTIVE SERVER MONITOR

FIELD OF THE DISCLOSURE

This disclosure relates to server monitoring, and more particularly, to a cold start and adaptive server monitoring technique.

BACKGROUND

A data center generally refers to a physical location used to house server computer systems and related components, such as networking gear and storage systems. Common uses for a data center include, for example, data processing and storage as well as hosting online applications for a company's customers. The company may operate the data center directly or indirectly via a third-party, and may have multiple data center locations depending on the specific needs of the company. In any such cases, the configurations of data centers change from time to time, such as the case where a new server is added to a given data center, or the case where a server is taken offline for software/hardware upgrading or repair or replacement. The changing of configuration is a major source of service disruption, for reasons such as bugs introduced during software upgrading, or system misconfiguration. Service disruptions can be extremely costly to the company, both in terms of direct financial impact and long-term reputation damage. Before service disruption happens, there are usually anomalies occurring in system metrics, such as high memory usage, high CPU usage, high disk usage, or a low number of hits from clients. Timely detecting such anomalies in system metrics can be helpful in addressing potential problems before they become severe.

It takes anywhere between minutes to hours or days for data center issues to emerge after system changes, so it is impractical for Site Reliability Engineering (SRE) teams to constantly watch all kinds of system metrics for problems. Currently, SRE team use manual thresholds for detecting anomalies. However, a manual threshold has several disadvantages. Firstly, it requires deep understanding about system behaviors. Without in-depth domain knowledge, it's virtually impossible to set proper thresholds. Secondly, a single manual threshold is ill-suited to handle natural data variations, e.g., seasonality. Thirdly, the environments are dynamic and continuously evolving, with all kinds of changes: customer base, system load/configuration, etc. Thus, a perfect threshold for now might not work for the future. Given these issues, a company may see major service disruption because a problem went unnoticed for hours or even days, ultimately leading to significant loss for the company. As such, there remain a number of non-trivial issues with respect to data center monitoring.

SUMMARY

Techniques are disclosed for monitoring server performance. While the techniques are useful in any number of situations, they are particularly useful in the case where a server is being added to a group of online servers of a given data center. The added server may be, for instance, a new server that increases the number of the existing servers, or one of the existing servers that had to be taken offline for repair or upgrading and is now being added back into the group. Further note the server being added may be one of a plurality of servers being added. An example embodiment of the techniques includes a server monitoring methodology which uses a time-series model for predicting value of a metric of a server. The model is built using initial training data that includes median values of the metric, each median value based on previously measured values of that metric, from servers of a group to which the server is being added. The methodology includes observing the value of the metric of the added server, and comparing that observed value to a predicted value of the model. In response to the observed value being within an expected tolerance (e.g., 3-sigma about the predicted value), the training data is updated to include the observed value. In response to the observed value being outside the expected tolerance, the training data is updated to include a value between the observed value of the server metric and the predicted value. The model is updated using the updated training data, and eventually adapts to performance of the server.

DETAILED DESCRIPTION

Figure 1:
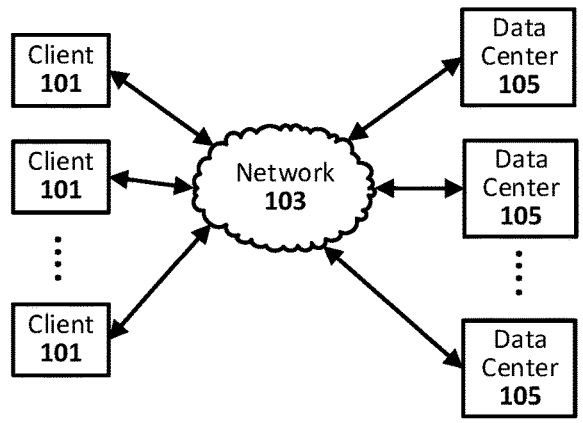
FIG. 1 illustrates an example client-server system that includes one or more data center locations that are monitored in accordance with an embodiment of the present disclosure.

Techniques are disclosed for monitoring server performance. While the techniques are useful in any number of situations, they are particularly useful in the case where a server is being added to a group of online servers of a given data center. The added server may be, for instance, a new server that increases the number of the existing servers, or one of the existing servers that had to be taken offline for repair or upgrading and is now being added back into the group. Further note the server being added may be one of a plurality of servers being added. In any such cases, one example of the techniques is a server monitoring methodology that includes the use of a time-series model for predicting the value of a server metric of the added server. The time-series model is built using the median value of the server metric at each of a plurality of time-stamps. Each median value of the server metric is based on previously measured values of the server metric at a corresponding time-stamp, from a group of servers of a data center. This median value and time-stamp data can be thought of, for example, as the initial training data upon which the time-series model is built, wherein each of the entries of the initial training data includes a corresponding one of the median values of the server metric and a corresponding time-stamp. The time-series model includes a predicted value of the server metric after the last time-stamp of the previously measured values. This predicted value can be used to assess that same metric for the server being added to the data center.

In more detail, for an additional server added to the group of servers, the methodology includes observing the value of the server metric, and comparing that observed value to the predicted value of the time-series model. Depending on the results of this comparison, the training data is updated to include a new entry that is based on or otherwise reflects the observed metric value of the added server, and the time-series model is updated using that updated training data, each time a new value for the metric is observed for the added server. In this manner, the future predicted values of the time-series model eventually adapt to or otherwise converge with the actual metric data values of the added server. How quickly the time-series model converges depends on how close the observed values of the added server are to the predicted values of the time-series model.

For instance, in some example cases, in response to the observed value of the server metric being within an expected tolerance range about the predicted value, the next value to be added to the training data upon which the time-series model is built is set to the observed value of the server metric. In contrast, in response to the observed value of the server metric being within a fault tolerance but outside the expected tolerance range, the next value to be added to the training data upon which the time-series model is built is set to a value between the observed value of the server metric and the predicted value. And in some cases, if the observed value of the server metric is not within the fault tolerance, then next value to be added to the training data is set to the predicted value, such that the observed value is effectively ignored or otherwise marginalized. In such fault mode cases, maintenance can be notified of the faulty metric data so appropriate action can be taken (e.g., the added server can be reconfigured or otherwise fixed and put back online). In any such cases, for each next value added to the training data, the time-series model can be updated, thereby eventually adapting the time-series model to observed values of the additional server.

As will be appreciated in light of this disclosure, setting the next value to be added to the training data to a value between the observed value of the server metric and the predicted value helps to avoid or otherwise reduce adversely impacting the accuracy of the time-series model, as well as oscillation while adapting the model to the observed data of the added server. To this end, the adaptation of the model to the observed data of the added server (also referred to as convergence herein) is carried out in a stabile fashion. As noted above, the training data initially has L median values, which each of these initial L entries of the training data including a corresponding one of the median values of the server metric and a corresponding time-stamp. Subsequent entries of the initial training data will each include a non-median value that is representative of the observed value of the server metric and a corresponding time-stamp, so the model is no longer purely built on median data. This is how the time-series model smoothly transitions or adapts over time from the initial historical median metric data of other servers in the data center to observed data of the added server. Eventually, the initial historical median metric data will be aged out of the model.

In more detail, and according to an example, subsequent time-stamps can be referred to with a counter initialized to L, and which is increased by one in response to each subsequent observed value of the server metric of the added server. A regularizing factor that approaches zero as the counter increases is computed for each such observed value. In addition, a standard deviation is computed based on the current training data, and a difference is computed between the observed value of the server metric and the predicted value. An adjustment value is then computed based on the regularizing factor, standard deviation, and the difference. This adjustment value can then be added to the predicted value to obtain the next value to be added to the training data. In some such example cases, the regularizing factor ranges from 0 to 1. The time-series model can then be updated with the updated training data. This process can be repeated for each observed value. Thus, if the monitoring frequency is such that the metric value is observed once per hour and the maximum collection period is two months, then L equals 1,440 (2*30*24, assuming 30 days per month). In such cases, the initial median metric data could be completely aged out of the time-series model in about 60 days or 1,440 observations of the metric of the added server.

Cold Start Problem

As previously explained, there are a number of non-trivial issues with respect to data center monitoring. For instance, and in the context of a client-server based system, the number of hits on a server over time for a given client can exhibit strong seasonality, such the case of daily seasonality where values for a given metric go up and down in similar way every day. To this end, setting one alerting threshold (e.g., alert when the number of hits falls below 20000) will either miss a significant drop during peak time, or give a false alarm in the low time. In addition, when a server is added to a group, whether it is a newly added server or an old one being added back after upgrading/repair, it starts fresh and effectively has no performance historical data. In some cases, the added server may have a trace of historical performance data, but any such trace data is sporadic and broken like random noise and thus not particularly useful. One possible monitoring solution for the added server might be to let it run for a brief initial time period (e.g., a week or two) to allow for collecting a sufficient amount of performance data, and then start to detect anomalies based on that collected performance data. However, the first hours or days of an added server are likely when problems will occur, such that the initial data might be anomalous by themselves, such as in the case where there is something wrong with the added server or a load balancer associated with that server. To this end, there is a cold start problem for the added server which effectively has no historical performance data. Complicating this cold start problem is that the added server will also affect the group behavior, as the load will be redistributed across the group eventually.

Therefore, according to an embodiment of the present disclosure, historical performance data of other servers with which the added server will be operating are used to build a time-series model useable to initially predict performance of the added server. The time-series predictive model can be updated continuously to adapt to the behavior change. Each server of the group, including any server that is added to the group, can thus have its own dedicated model that evolves or otherwise adapts to the observed normal operation of that server. To this end, techniques provided herein allow for improved server monitoring. The techniques can be implemented in a client-server architecture, as will now be discussed with reference to the example embodiment of FIG. 1.

System Architecture

FIG. 1 illustrates an example client-server system that includes one or more data center locations that are monitored in accordance with an embodiment of the present disclosure. As can be seen, the architecture includes a plurality of clients 101 that are communicatively coupled via a network 103 to one or more data centers 105. Other embodiments may include fewer or more clients 101 and/or data centers 105, and the present disclosure is not intended to be limited to the example configuration shown.

Each of the clients 101 can be implemented with any standard or proprietary computing system, such as a desktop or laptop computer, a workstation, a smart phone, or any other intelligent device capable of accessing other systems via network 103, such as data centers 105. The network 103 can be any private and/or public communication networks, such as a private local area network (e.g., local wireless network) that is operatively coupled to a public wide area network (e.g., the Internet). Any combination of private and/or public communication networks can be used, including both wired and wireless technologies. Each data center 105 can provide any number of services available to clients 101 via network 103, such as application hosting and/or data analysis. The data centers 105 each include a plurality of servers to support the various functions provided to clients 101, and can be further configured with any number of standard or proprietary data center equipment. In any such cases, at least one of the data centers 105 further includes a server monitoring system configured to monitor server performance, as will be discussed with reference to FIGS. 2a-b.

As will be appreciated, the present disclosure is not intended to be limited to any particular client 101 configurations, or any particular network 103 configurations, or any particular data center 105 configurations. Rather, the techniques provided herein can be used with any number of data center configurations where monitoring server performance to detect anomalous behavior is desired.

Figure 2A:
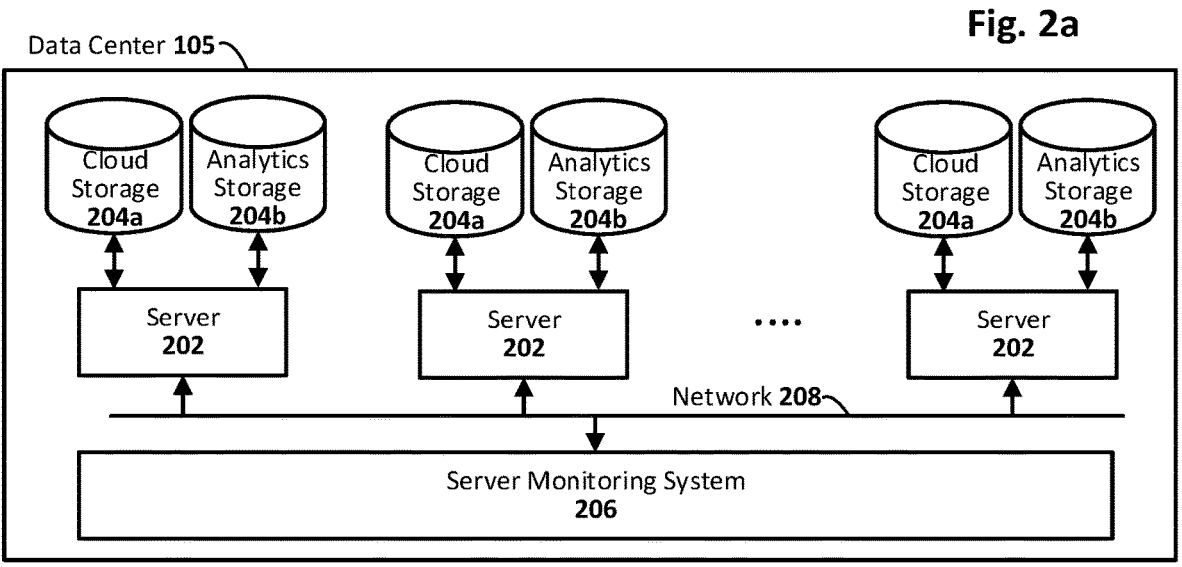
FIG. 2*a* illustrates an example data center that includes a server monitoring system configured in accordance with an embodiment of the present disclosure.

FIG. 2a illustrates an example data center 105 that includes a server monitoring system 206 configured in accordance with an embodiment of the present disclosure. As can be seen, the data center 105 includes a plurality of servers 202, each of which is operatively coupled with storage 204a and 204b. Each of the servers 202 is communicatively coupled with the server monitoring system 206 via a communication network 208. The particular configuration of the servers 202, storage 204a-b (if present), and communication network 208 is not particularly important to this disclosure, as will be appreciated. To this end, the servers 202, storage 204a-b (if present), and communication network 208 can have any desired configuration suitable for a given application. Moreover, a given data center 105 can further include any number of other standard or proprietary data center equipment, such as load balancers, switches, routers, telecommunication equipment, power supply redundancy, and environmental control equipment, to name a few examples.

As can further be seen in this example embodiment, the server monitoring system 206 is centralized and is communicatively coupled with each of the servers 202 via the network 208. Variations will be apparent. For instance, in other embodiments, server monitoring system 206 may be at least partly distributed, such that at least some of the functionality of the monitoring system 206 may reside on the individual servers 202 while other functionality of the monitoring system 206 may reside on a central computing system that can communicatively couple with each server 202 via network 208. In still other embodiments, each server 202 can include its own dedicated monitoring system 206.

In any such cases, the server monitoring system 206 can be configured to address the cold start problem for servers added to the data center, according to an embodiment of the present disclosure. In particular, the server monitoring system 206 keeps track of the median values of monitored metrics of all servers in the same data center 105. Examples of metrics that can be monitored include, for instance, memory usage, CPU usage, disk wait time, and number of hits from clients, to name a few. For each metric in the $j^{th}$ data center, that metric's median value over time forms time-series, which is referred to herein as initial training data, and is denoted as $\hat{X}_j$. Note that the entire history of median values is not necessarily required. Rather, in some example cases, $\hat{X}_j$ only contains the latest two months of median values, or some other time period that provides a window of historical data that accounts for all seasonality of the given application, and is thus enough for building a time-series model. Other models may be built on data collected over a longer period (e.g., one or more years), and still other models may be built on data collected over a shorter period (e.g., hours, days or weeks). Further note that using the mean value over all servers (as opposed to median value) was found to be less stable, as it can be affected by extreme values from a small number of servers. In any such cases, when a server is added to the $j^{th}$ data center, for each system metric to track, the initial training data for that data center and corresponding metric can be retrieved (e.g., from storage 204a-b or 254) and used to jump start the monitoring service for the added server.

Figure 2B:
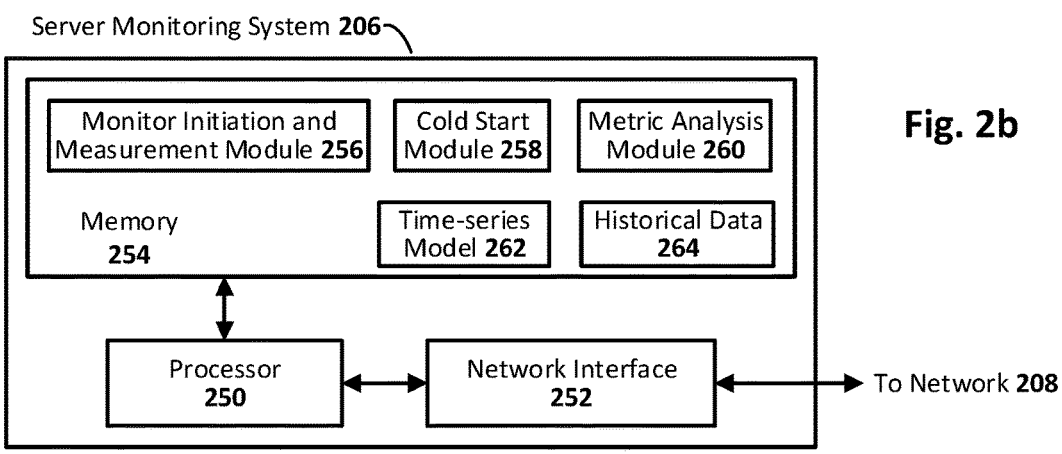
FIG. 2*b* illustrates an example server monitoring system configured in accordance with an embodiment of the present disclosure.

FIG. 2b illustrates an example server monitoring system 206 configured in accordance with an embodiment of the present disclosure. As can be seen, the server monitoring system 206 of this example includes a processor 250 operatively coupled to a network interface 252 and a memory 254. The memory 254 includes historical data 264 and a time-series model 262, as well as a number of modules that are accessible to, and executable by, the processor 250. These modules include a monitor initiation and measurement module 256, a cold start module 258, and a metric analysis module 260.

As will be appreciated, the processor 250, network interface 252, and memory 254 can be implemented with standard or proprietary technology, such as those typical of a standard computing system, and the specific configuration of any of these is not particularly relevant to this disclosure. In some cases, note that processor 250 may include multiple processors and/or cores so as to accommodate processing power suitable for a given application (e.g., graphics processor for processing graphics, multiple processors or cores for parallel processing or otherwise increasing computing power, digital signal processor for relatively low power pipeline processing, etc.). Likewise, note that memory 254 may include multiple memory types, such as read-only memory, random-access memory, disc drive memory, memory onboard processor 250, or some combination of memory. In any case, the present disclosure is not intended to be limited to the example configuration depicted in FIG. 2b; rather, any number of computing platforms and configurations can be used to carry out the server monitoring functionality as variously described herein.

The monitor initiation and measurement module 256 is programmed or otherwise configured to periodically initiate the server metric monitoring process, and to observe each metric to be monitored. In addition, module 256 detects if the server being monitored is newly added to the server group of the data center 105. This detection can be carried out, for instance, by observing the address of the added server, or as a result of a registration or handshaking process to which added servers are subjected. In some example embodiments, the server metric monitoring process is initiated once an hour (e.g., on the top of each hour), although any schedule suitable for a given data center can be used. If the server is not newly added to the data center (i.e., the metric being monitored has been observed at least once before), then the metric value is observed and passed to the metric analysis module 260.

If, on the other hand, module 256 determines that the server is newly added, then module 256 issues a call to the cold start module 258. The cold start module 258 is programmed or otherwise configured to assemble or otherwise provide training data from which the time-series model 262 is built. In particular, and according to one such embodiment, module 258 accesses historical data 264 which includes previously measured metric data for the other servers 202 in the data center 105 to which the server is being added. Module 258 then computes median values of that metric data for each time-stamp at which that data was measured, across all servers 202 of the data center 105 (not counting the new server, which has no historical data). The resulting training data effectively includes a plurality of entries, each entry including a median value of the target metric and a corresponding time-stamp. So, for example, the initial training data can be represented as $\tilde{X}=\tilde{X}_0, \tilde{X}_1, \ldots \tilde{X}_{i-1}$, where $\tilde{X}_k=(t_k, m_k)$ represents the training data entry at the $t_k$ time-stamp, and $m_k$ is the median value of normal previously measured metric data at the $k^{th}$ time-stamp (from data 264).

Module 258 can thus maintain training data $\tilde{X}$ as time-series data, which can be readily applied to a time-series forecasting tool. To this end, and in accordance with some embodiments, module 258 uses a time-series forecasting tool such as Prophet, ARIMA (autoregressive integrated moving average), or SARIMA (seasonal ARIMA) to generate time-series model 262. Any such time-series forecasting methods can take inputs of the historical data 264, and build a time-series model that best fits the historical data. Note that the time-series forecasting tool can be coded into the cold start module 258, or called by the cold start module 258, or otherwise be accessible to the cold start module 258, for purposes of generating the time-series model. In any such cases, the resulting time-series model can be used for predicting future values of the metric being monitored. The initial time-series model includes L entries, each entry including a median observed value of the metric and a time-stamp (e.g., 1997-08-29 02:14:00, although any number of time-stamp formats can be used as will be appreciated). In some such example embodiments, the module 258 initializes a counter (i) which is available to the metric analysis module 260, along with the initial time-series model.

The metric analysis module 260 is programmed or otherwise configured to compare each subsequent observed metric value of the added server with predicted value at the corresponding time-stamp. In response to the observed value of the server metric being within an expected tolerance range about the predicted value, module 260 sets the next value to be added to the training data upon which the time-series model is built to the observed value of the server metric. However, in response to the observed value of the server metric being within a fault tolerance but outside the expected tolerance range, module 260 sets the next value to be added to the training data to a value between the observed value of the server metric and the predicted value. In addition, if the observed value of the server metric is not within the fault tolerance, module 260 sets the next value to be added to the training data to the predicted value, such that the observed value is effectively ignored or otherwise marginalized. In such fault mode cases, maintenance can be notified of the faulty metric data so appropriate action can be taken (e.g., the added server can be reconfigured or otherwise fixed and put back online). In any such cases, for each next value added to the training data, module 260 then updates the time-series model. As will be appreciated, this allows the time-series model to adapt to or otherwise converge on the observed values of the added server, according to an embodiment.

Further details of modules 256, 258, and 260 will be discussed in turn with reference to FIGS. 3-7d. As will be appreciated in light of this disclosure, modules 256, 258, and 260 can be implemented in software, such as a set of instructions (e.g. C, C++, object-oriented C, JavaScript, BASIC, etc.) encoded on any computer readable medium (e.g., hard drive, server, or other suitable memory), that when executed by one or more processors, cause the various methodologies provided herein to be carried out. In other embodiments, the modules 256, 258, and 260 may be implemented with hardware, such as gate level logic (e.g., FPGA) or a purpose-built semiconductor (e.g., ASIC). Still other embodiments may be implemented with a microcontroller having a number of input/output ports for receiving and outputting data, and a number of embedded routines for carrying out the functionality described herein. Any suitable combination of hardware, software, and firmware can be used. Moreover, note that while monitoring functionality of system 206 is depicted with three modules 256, 258, and 260, other embodiments may include fewer or more modules. To this end, the degree of integration can vary from one embodiment to the next, and the present disclosure is not intended to be limited to the example configuration depicted in FIG. 2b.

Methodology

Figure 3:
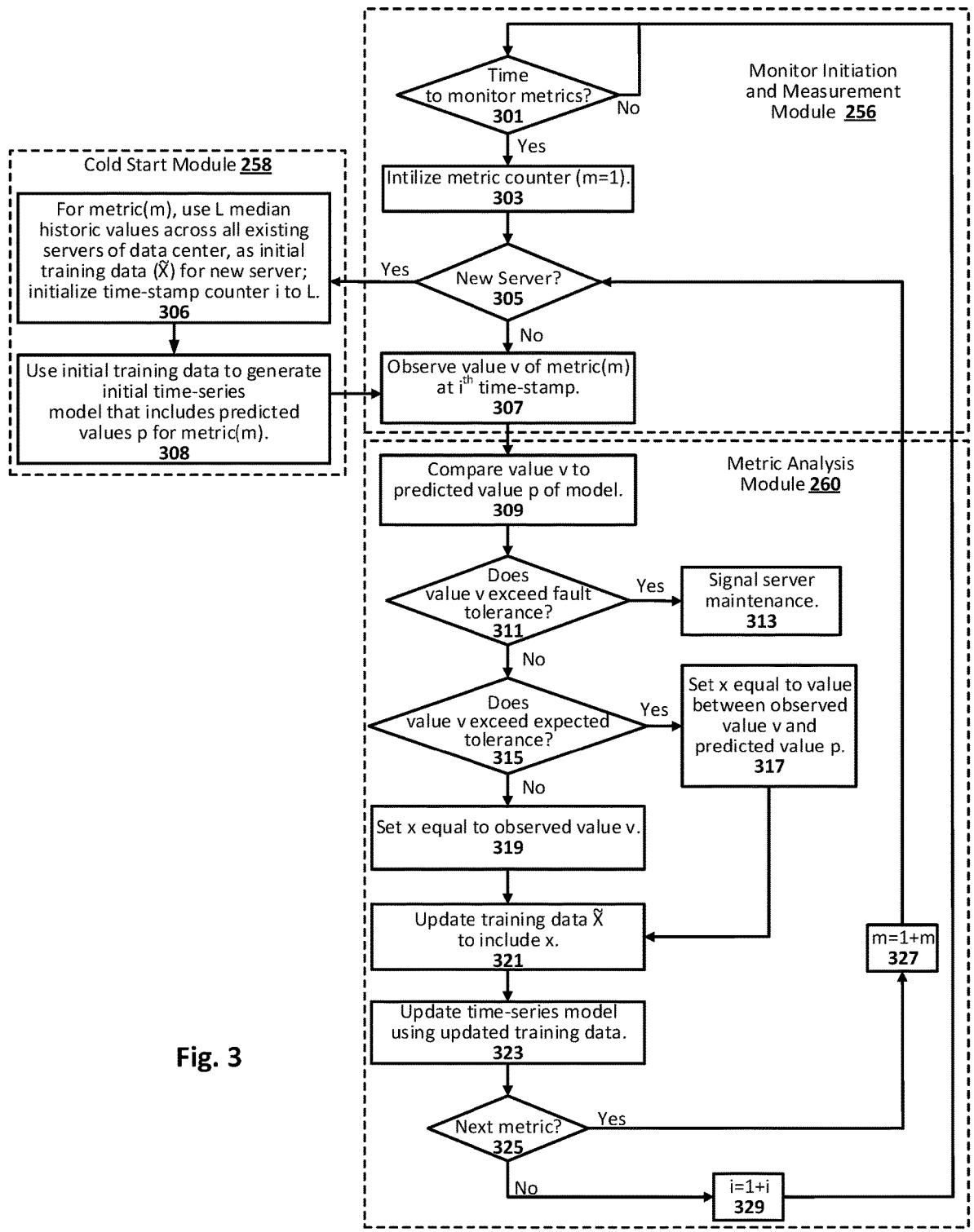
FIG. 3 illustrates an example methodology for monitoring server performance, in accordance with an embodiment of the present disclosure.

FIG. 3 illustrates an example methodology for monitoring server performance, in accordance with an embodiment of the present disclosure. As can be seen, functionality of the method is attributed to modules 256, 258, and 260 of FIG. 2b in this example embodiment, but other embodiments may have similar functionality carried out by any number of functional modules, whether in hardware, software, or some combination, as will be appreciated in light of this disclosure.

The method includes determining 301 whether it is time to monitor metrics of interest, or not. If not, the method includes waiting until the appropriate time. If, on the other hand, it is time to monitor the metrics, then methodology continues with initializing 303 a metric counter or ID (e.g., m=1), and then determining 305 if the server being monitored is a new server. As previously explained, this determination at 305 can be made based on the address (e.g., MAC address) of the server not being recognized as an existing server of the group included in the data center, or during an initial handshaking process that takes place when the server is initially put online in the data center. Other techniques for determining that the server is newly added to the data center can be used as well.

In any case, if the server is not new, then the method continues with observing 307 the value v of the metric(m) for the server. On the other hand, if the server is new, then the method continues with using 306 L median historic values of the target metric (as previously measured across all other servers of the data center) as training data $\tilde{X}$ to build a time-series model, and initializing the time-stamp counter (e.g., set i to L). The method further includes generating 308 an initial time-series model that includes a predicted value p for metric(m). Recall that a time-series forecasting tool (e.g., Prophet, ARIMA, SARIMA, or a proprietary tool) can be used to generate the time-series model at 308. This initial time-series model can be used to jump-start the server monitoring process for an added server that has no or otherwise inadequate historical metric data. The example methodology of FIG. 3 then continues at 307 with observing the value v of the metric(m) for the server.

Figure 4:
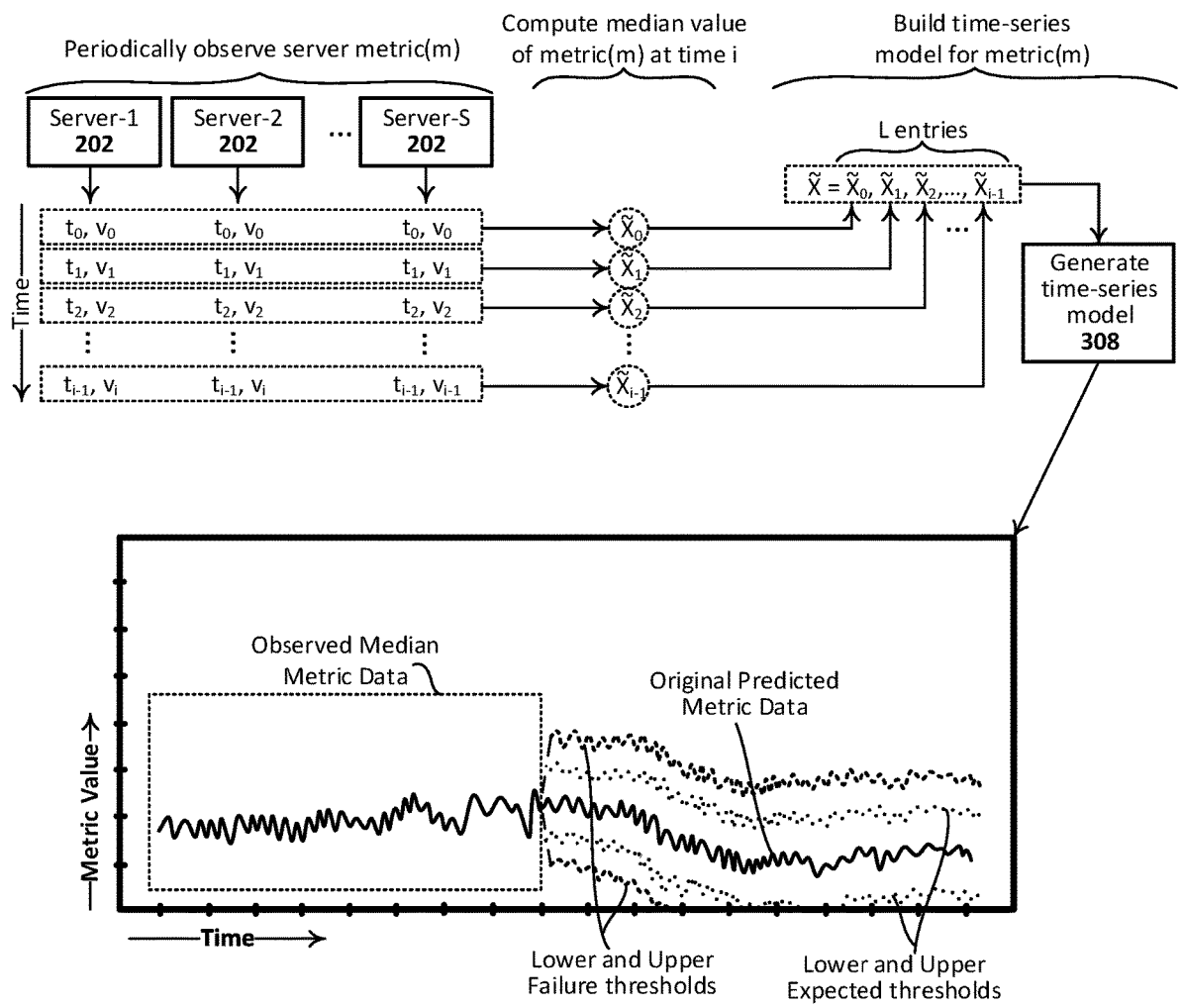
FIG. 4 illustrates how the methodology of FIG. 3 builds a time-series model from historical median server metric data of a given data center, in accordance with an embodiment of the present disclosure.

FIG. 4 graphically illustrates how the training data $\tilde{X}$ is derived at 306. As can be seen, the values $v_0$ of the target metric, as previously observed at time to for each of the S servers 202, are used to compute a first median value, and that first median value and corresponding time-stamp are designated as $\tilde{X}_0$. Similarly, the values $v_1$ of the target metric, as previously observed at time $t_1$ for each of the S servers 202, are used to compute a second median value, and that second median value and corresponding time-stamp are designated as $\tilde{X}_1$. Similarly, the values $v_2$ of the target metric, as previously observed at time $t_2$ for each of the S servers 202, are used to compute a third median value, and that third median value and corresponding time-stamp are designated as $\tilde{X}_2$. And so on. The final median value entry of the initial training data $\tilde{X}$ is based on values $v_{i-1}$ of the target metric, as previously observed at time $t_{i-1}$ for each of the S servers 202, and that final median value and corresponding time-stamp are designated as $\tilde{X}_{i-1}$. The L entries of the initial training data are then used at 308 to generate the time-series model. As previously explained, a time-series forecasting tool such as Prophet, ARIMA, or SARIMA can be used to generate time-series model at 308.

Before joining a data center, a server has no history of memory usage, so there is no prediction (expected value/range) either. Thus, there is only one curve (the training data $\tilde{X}$) in that time period. Using memory usage monitor as an example, the median memory usage of all servers in the same data center is used as the training data $\tilde{X}$ for a new server. So, for instance, the plot at the bottom of FIG. 4 graphically depicts the value of the metric over time, including both the time period that corresponds to the historical observed median metric data (shown in the dashed box, and also referred to herein as the training data $\tilde{X}$), as well as the time period that corresponds to the predicted metric data (shown to the right of the dashed box) of the time-series model generated by the time-series forecasting tool, under direction of the cold start module 258. As can be seen, the plot includes the original predicted metric data over the time period of interest, along with lower and upper expected thresholds (e.g., +/−three times the standard deviation of the median values) and lower and upper failure thresholds (e.g., +/−six times the standard deviation of the median values).

With further reference to FIG. 3, once the initial time-series model is generated at 308 and the value v of metric(m) is observed at the next time-stamp i at 307, the methodology continues with metric analysis, and includes comparing 309 the observed value v to the predicted value p of the time-series model. If the determination at 311 indicates that the observed value v exceeds the fault tolerance (e.g., 6-sigma about the predicted value), then the method includes signaling 313 maintenance (e.g., via email, text, alarm, etc.) or otherwise indicating a fault, so that the server can be further evaluated and repaired as needed. On the other hand, if the determination at 311 indicates that the observed value v is within the fault tolerance, then a further determination at 315 is made as to whether the observed value v exceeds the expected tolerance (e.g., 3-sigma about the predicted value). In response to the observed value v being within the fault tolerance but outside the expected tolerance, then the method continues at 317 with setting x (the next value to be added to the training data upon which the time-series model is built) to a value between the observed value v and the predicted value p. On other hand, in response to the observed value v being within the expected tolerance, the method continues at 319 with setting x to the observed value v. The method continues with updating 321 the training data to include x, and then updating 323 the time-series model using the updated training data. If the determination at 325 indicates that another metric is to be analyzed, then the method continues at 327 with updating the metric counter (e.g., m=m+1) and the process is repeated for that next metric. On the other hand, if the determination at 325 indicates no other metrics are to be analyzed, then the method further includes incrementing the time-stamp counter i at 329 in preparation for the next analysis cycle, and waits for the next monitoring time at 301.

Figure 5:
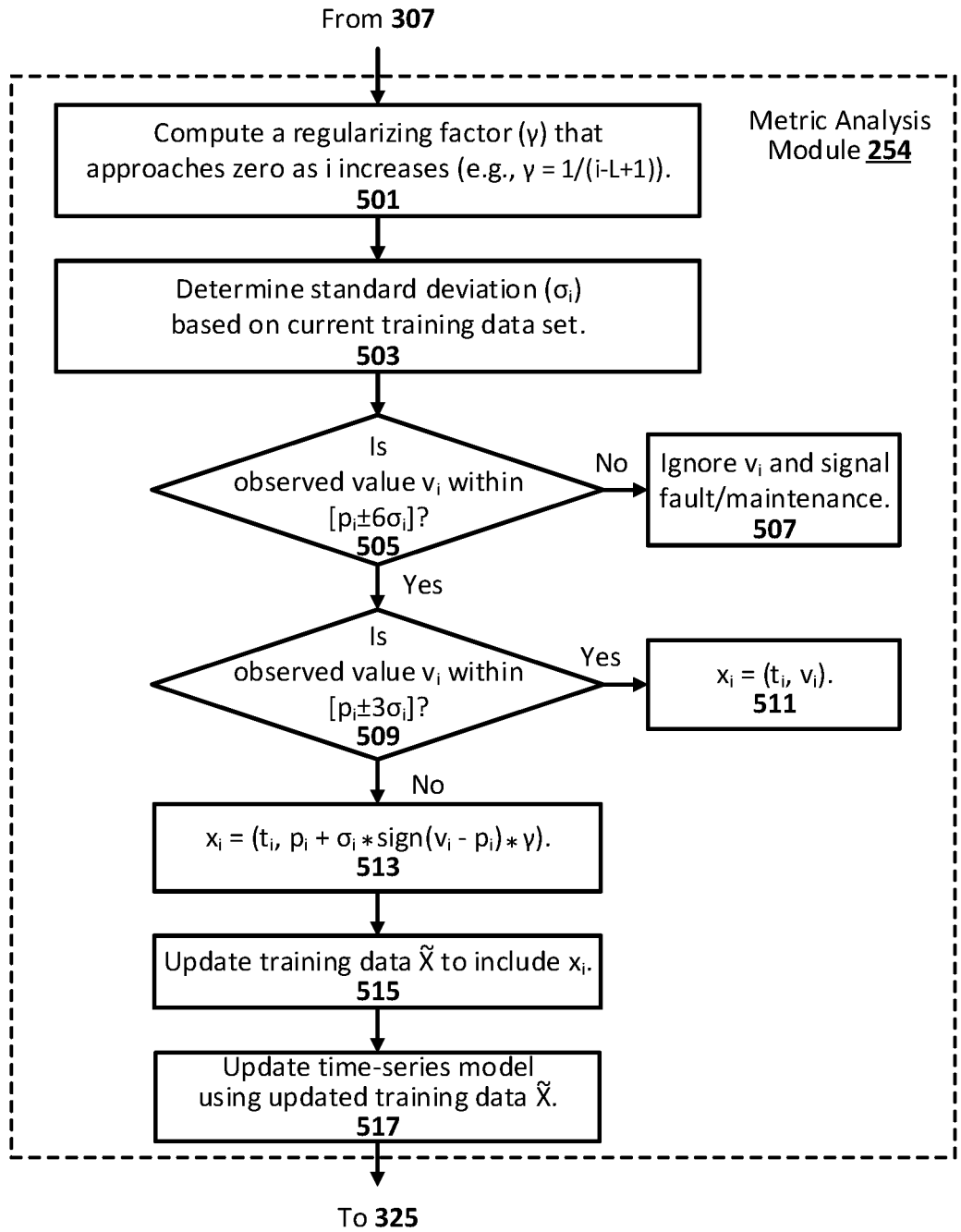
FIG. 5 illustrates example metric analysis performed during the methodology of FIG. 3, in accordance with an embodiment of the present disclosure.

FIG. 5 illustrates further details of metric analysis performed during the methodology of FIG. 3, in accordance with an embodiment of the present disclosure. Assume the initial time-series model is generated at 308 and the value $v_i$ of metric (m) is observed at 307 for the $i^{th}$ time-stamp. Further recall that L refers to the length of the initial training data (e.g., $\tilde{X}=\tilde{X}_0, \tilde{X}_1, \ldots \tilde{X}_{i-1}$), and i is initialized to L. So, the metric analysis includes computing 501 a regularizing factor ($\gamma$) that approaches zero as i increases, and determining 503 the standard deviation ($\sigma_i$) of the current training data set $\tilde{X}$. In some embodiments, $\gamma$ is set to: 1/[i−L+1], such that the first value for $\gamma$ is 1, and subsequent values of $\gamma$ progressively decrease toward 0 for each incrementation of i at 329 and subsequent pass through the metric analysis process illustrated in FIG. 3, according to an embodiment.

The standard deviation $\sigma_i$ is used to compute tolerances against which the observed value $v_i$ is compared. In more detail, and according to the example embodiment of FIG. 5, the methodology includes determining at 505 if the observed value $v_i$ is within a fault tolerance of the predicted value $p_i$: [$p_i \pm 6*\sigma_i$]. Although a 6-sigma tolerance of $p_i$ is used for the fault tolerance, other embodiments may use another fault tolerance. If the determination at 505 indicates a fault, then the method includes ignoring 507 the observed value $v_i$ and signaling a fault and/or maintenance so the fault condition of the server being monitored can be resolved. On the other hand, if the determination at 505 indicates no fault, then the method includes determining at 509 if the observed value $v_i$ is within an expected tolerance of the predicted value $p_i$: [$p_i \pm 3*\sigma_i$]. Although a 3-sigma tolerance of $p_i$ is used for the expected tolerance, other embodiments may use another expected tolerance. If the determination at 509 indicates that the observed value $v_i$ is within the expected tolerance, then the method continues at 511 with setting $x_i$ (the next value to be added to the training data $\tilde{X}$) to the observed value $v_i$ and its corresponding time stamp $t_i$: $x_i=[t_i, v_i]$.

On other hand, if the determination at 509 indicates that the observed value $v_i$ is not within the expected tolerance, then the method continues at 513 with setting $x_i$ to a value between the observed value $v_i$ and $p_i$ and the corresponding time stamp $t_i$: $x_i=[t_i, p_i+\text{sign}(v_i, p_i)*\gamma*\sigma_i]$. The method continues with updating 515 the training data $\tilde{X}$ to include $x_i$, and then updating 517 the time-series model using the updated training data $\tilde{X}$. The next metric m can then be processed as indicated at 325 (if there is a next metric), or the monitoring process concludes for that metric monitoring cycle and the process waits for the next monitoring cycle as indicated at 329 and 301.

A number of benefits with respect to the metric analysis provided herein will be appreciated. To facilitate discussion, let $O_i$ represent an observed value $v_i$ and its corresponding time-stamp $t_i$: $O_i=[t_i, v_i]$. By using the observed value $v_i$, the updated training data $\tilde{X}$ can adapt to moderate trend changing in the observations. If the observed value $v_i$ is out of the predicted range (e.g., 3-sigma) but within the fault range (e.g., 6-sigma) as indicated at 509, then $x_i$ is set to:

$$p_i + \text{sign}(v_i - p_i) * \frac{1}{i-L+1} * \sigma_i,$$

for purposes of updating the training data $\tilde{X}$. Because in this case, $O_i$ is an exception based on the estimate provided by the time-series model, using $O_i$ for building the time-series model will likely hurt the model accuracy. Note $x_i \neq p_i$, since we cannot totally rely on the predicted value and range: they may not always be accurate. When $v_i > p_i$, $\text{sign}(v_i - p_i)$ is positive; otherwise it is negative. As a result, $x_i$ will be pulled slightly toward $v_i$. In the example embodiment of FIG. 5, the pulled distance is determined by the standard deviation $\sigma$ and the regularizing factory. The regularizing factory shrinks as time goes on, reflecting the assumption that a metric value might be volatile when a server has just joined the data center but eventually will stabilize. Therefore, $x_i$ is allowed to drift more at the beginning so it has more flexibility for adaptation. Although each time $x_i$ is only pulled a little bit toward $O_i$, they will converge over time. The regularizing factor $\gamma$ helps to regularize the converging process so it will not oscillate. As will be appreciated, such regularization is a form of regression that shrinks coefficient estimates towards zero, and avoids the risk of overfitting.

FIGS. 6a-d graphically illustrate an example of how the methodology of FIG. 3 or 5 updates the time-series model in response to observed metric data of a new server, in accordance with an embodiment of the present disclosure. As can be seen, a new server 203 is being added to a group of servers 202. The previous discussion with reference to FIG. 4 with respect to how the initial training data $\tilde{X}$ is derived at 306 based on historical data of servers 202, is equally applicable here. To this end, the initial training data $\tilde{X}$ is set to $\{\tilde{X}_0, \tilde{X}_1, \ldots \tilde{X}_{i-1}\}$, and i is initialized to L.

Figure 6A:
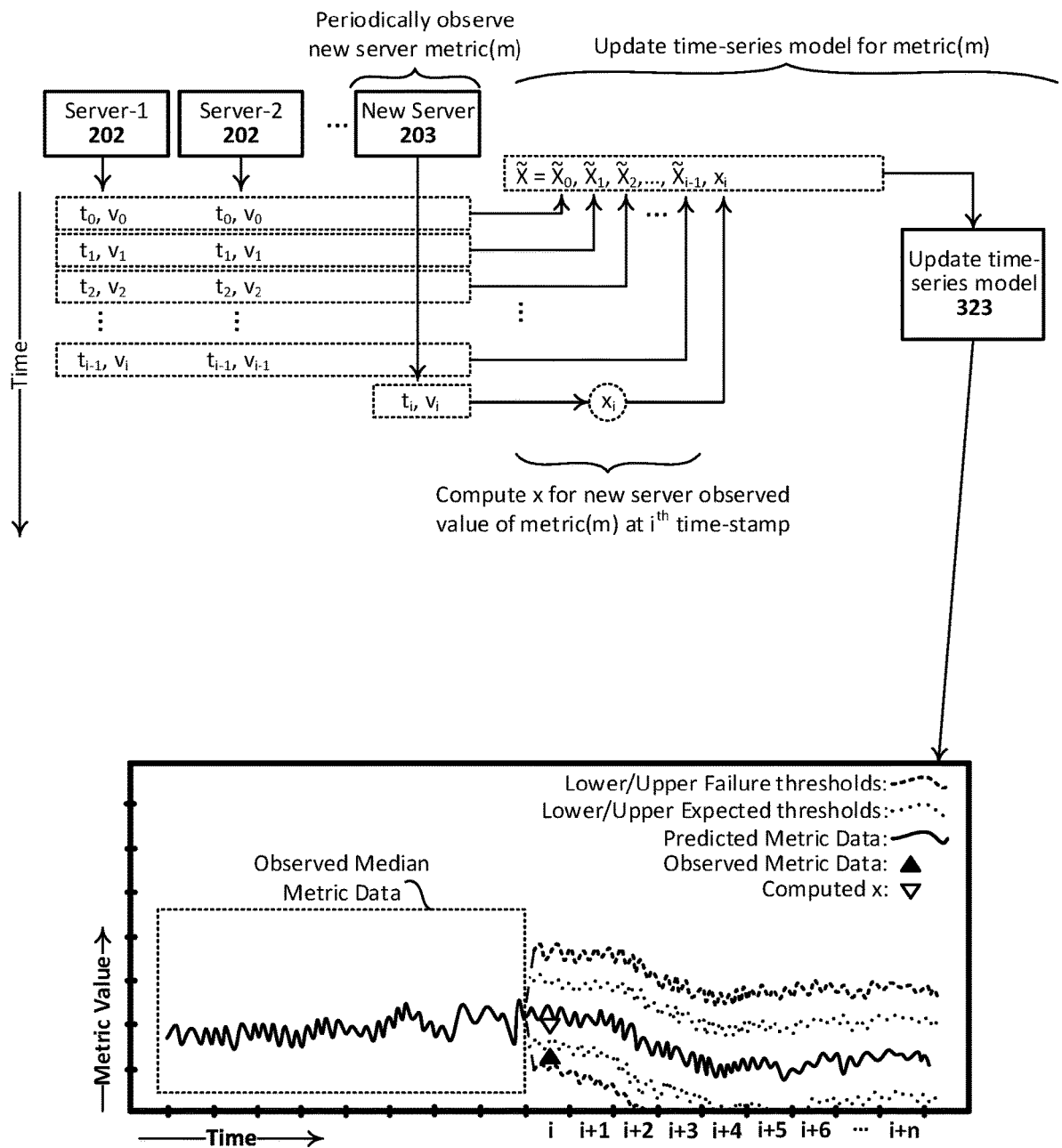
FIGS. 6*a-d* graphically illustrate an example of how the methodology of FIG. 3 or 5 updates the time-series model in response to observed metric data of a new server, in accordance with an embodiment of the present disclosure.

So, and with reference to FIG. 6a, the addition of server 203 to the data center is detected and the metric(m) of the server is observed. As can be seen in the graph on the bottom FIG. 6a, the value $v_i$ of the target metric, as presently observed at time $t_1$ for the added server 203 is within the failure threshold but outside the expected threshold, as depicted with a solid black triangle that points upward. Thus, $x_i$ is set to a value between the observed value $v_i$ and the predicted value $p_i$ and the corresponding time stamp as indicated at 317 (e.g., $x_i=[t_i, p_i+\text{sign}(v_i-p_i)*\gamma*\sigma_i]$, as indicated at 513). This value $x_i$ is designated in the graph on the bottom of FIG. 6a as a solid white triangle that points downward. The predicted value $p_i$ is on the solid black line at time $t_i$. The training data $\tilde{X}$ is updated at 321 or 515 to include the resulting value for $x_i$, and the time-series model is updated at 323 or 517 using the updated training data $\tilde{X}$. Note that subsequent predicted values, upper and lower failure thresholds, and upper and lower expected thresholds can change with each iteration of the model, based on the last addition of $x_i$ to training data $\tilde{X}$.

Figure 6B:
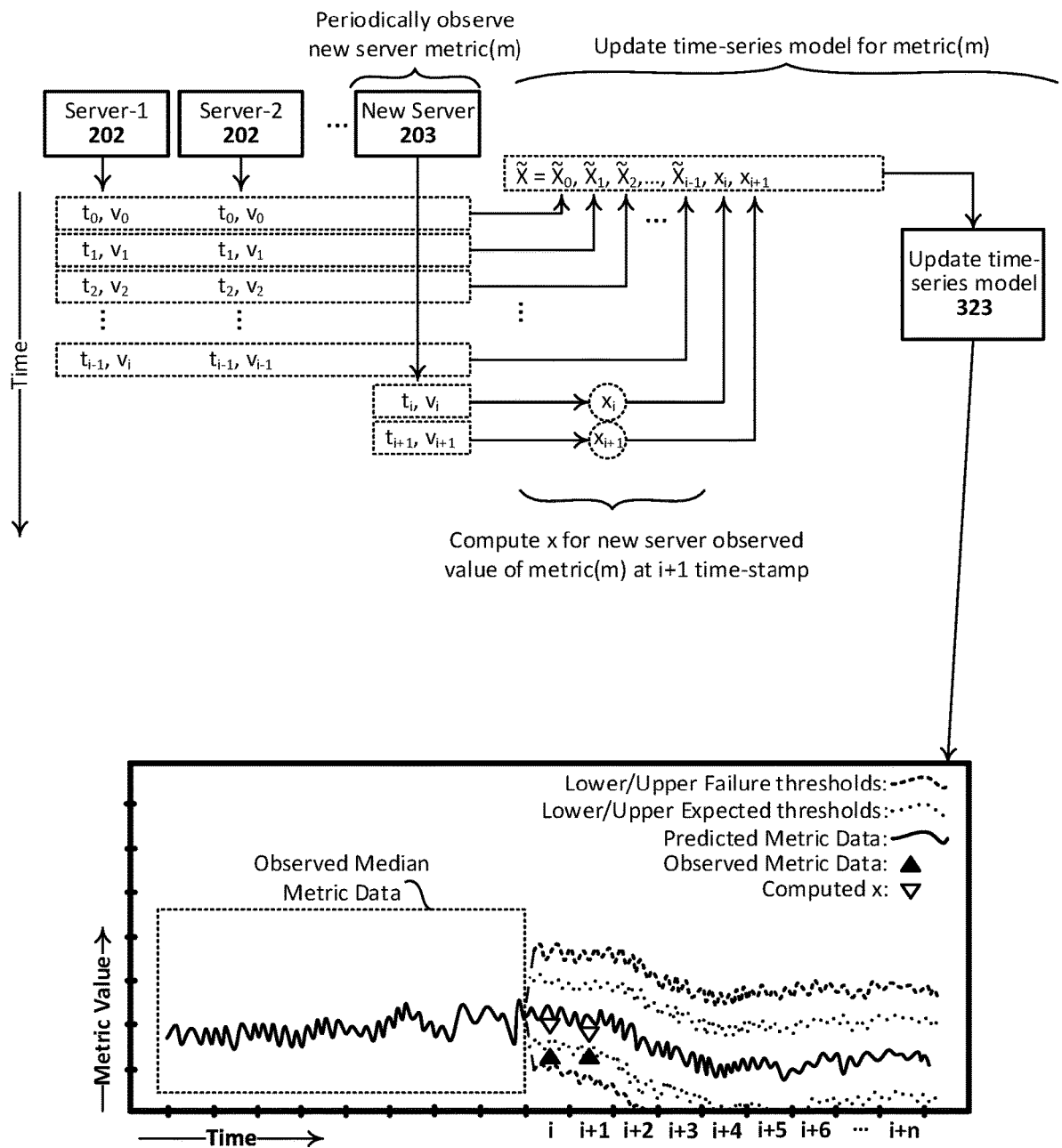

FIG. 6b shows the example process repeating the observation and analysis of metric(m) at the next time-stamp, i+1. As can be seen, the value $v_{i+1}$ of the target metric, as observed at time $t_{i+1}$ for the added server 203 is again within the failure threshold but outside the expected threshold, as depicted with a second solid black triangle that points upward. Thus, $x_{i+1}$ is set to a value between the observed value $v_{i+1}$ and the predicted value $p_{i+1}$ and the corresponding time stamp $t_{i+1}$, as indicated at 317 (e.g., $x_{i+1}=[t_{i+1}, p_{i+1}+\text{sign}(v_{i+1}*\gamma*\sigma_{i+1}]$, as indicated at 513). This value $x_{i+1}$ is designated in the graph on the bottom of FIG. 6b as a second solid white triangle that points downward. The predicted value $p_{i+1}$ is on the solid black line at time $t_{i+1}$. The training data $\tilde{X}$ is updated at 321 or 515 to include the resulting value for $x_{i+1}$, and the time-series model is again updated at 323 or 517 using the updated training data $\tilde{X}$, thereby providing updated predicted values, upper and lower failure thresholds, and upper and lower expected thresholds for the next iteration.

Figure 6C:
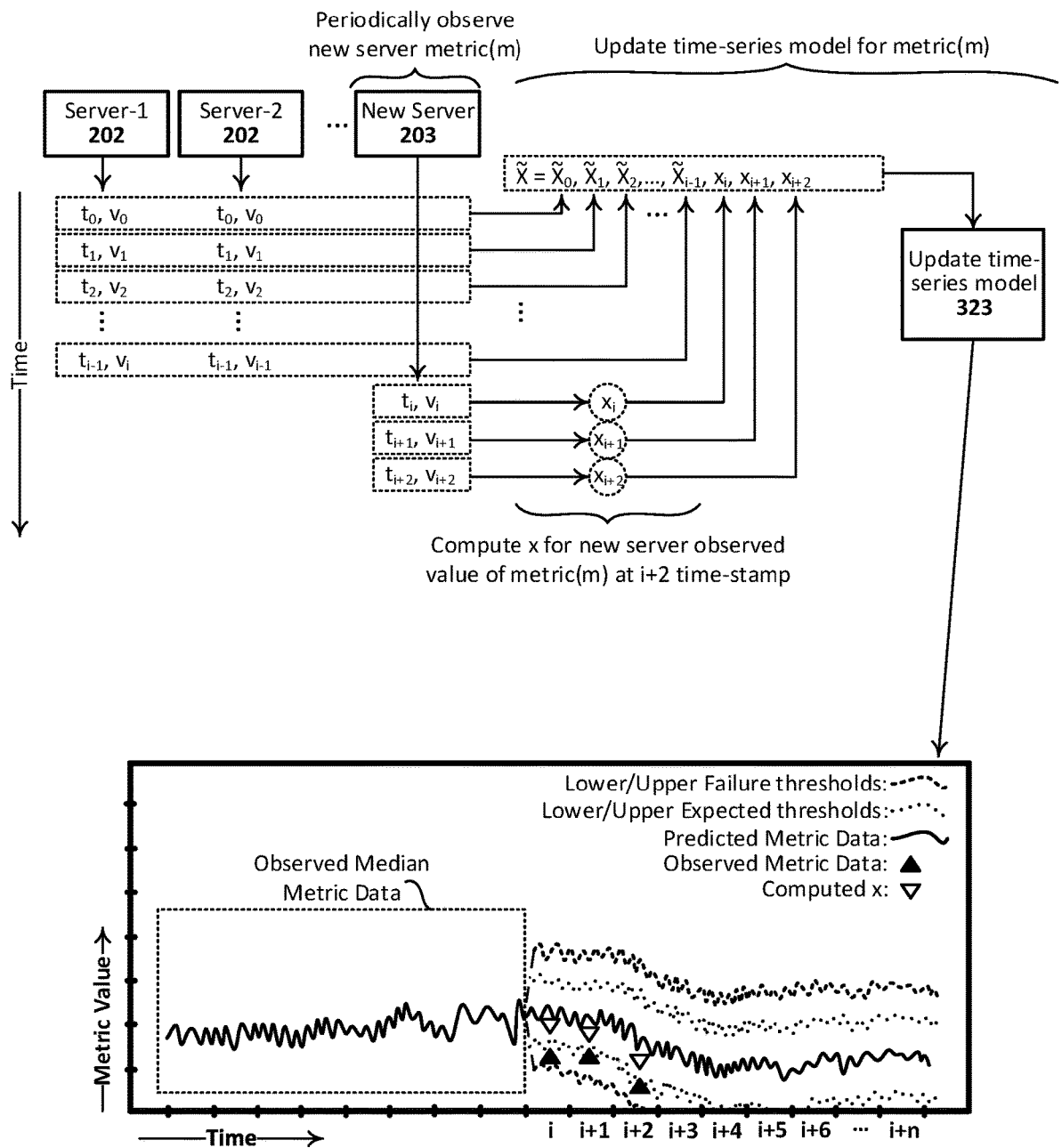

FIG. 6c shows the example process repeating the observation and analysis of metric(m) at the next time-stamp, i+2. As can be seen, the value $v_{i+2}$ of the target metric, as observed at time $t_{i+2}$ for the added server 203 is again within the failure threshold but outside the expected threshold, as depicted with a third solid black triangle that points upward. Thus, $x_{i+2}$ is set to a value between the observed value $v_{i+2}$ and the predicted value $p_{i+2}$ and the corresponding time stamp $t_{i+2}$, as indicated at 317 (e.g., $x_{i+2}=[t_{i+2}, p_{i+2}+\text{sign}(v_{i+2}*\gamma*\sigma_{i+2}]$, as indicated at 513). This value $x_{i+2}$ is designated in the graph on the bottom of FIG. 6b as a third solid white triangle that points downward. The predicted value $p_{i+2}$ is on the solid black line at time $t_{i+2}$. The training data $\tilde{X}$ is updated at 321 or 515 to include the resulting value for $x_{i+2}$, and the time-series model is again updated at 323 or 517 using the updated training data $\tilde{X}$, thereby providing updated predicted values, upper and lower failure thresholds, and upper and lower expected thresholds for the next iteration.

Figure 6D:
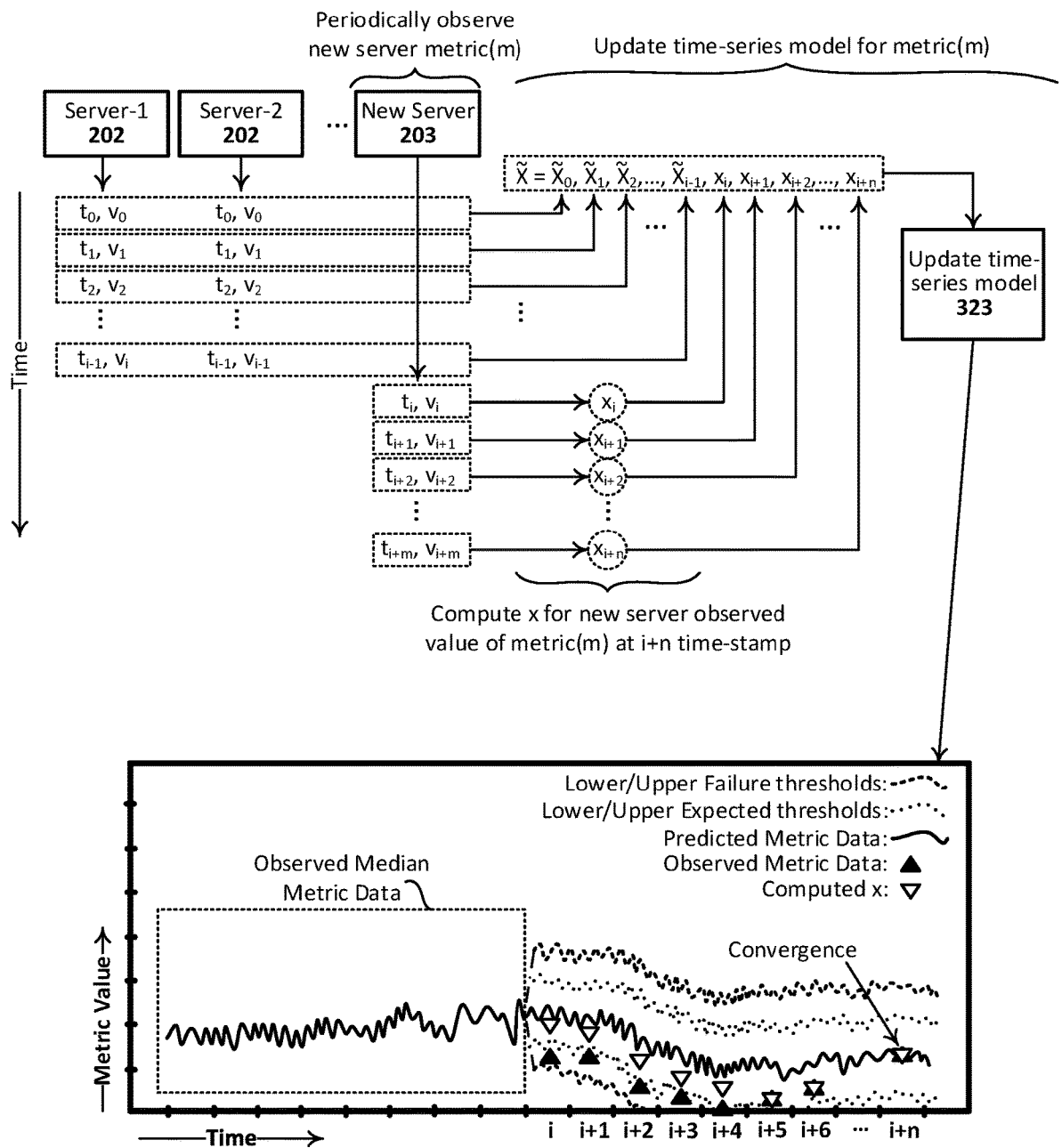

FIG. 6d shows example results after i+n iterations of the process which culminated in convergence of the predicted value $p_{i+n}$ and the observed value $v_{i+n}$ at time $t_{i+n}$. Note that convergence doesn't necessarily require the predicted value of metric(m) be exactly the same as the observed value of metric(m); rather, convergence may be considered achieved, for example, when the predicted value is within 5% (or less) of the observed value of metric(m), or vice-versa. To this end, the predictive data and the observed data need not perfectly match and may deviate from one another, as will be appreciated in light of this disclosure. As can be further seen in FIG. 6d, the observed value at each of time-stamps $t_{i+3}$ and $t_{i+4}$ was outside the expected tolerance, so each of $x_{i+3}$ and $x_{i+4}$ was set as discussed with respect to 317 or 513. At time-stamp $t_{i+5}$, the observed value $v_{i+5}$ was within the expected tolerance of the predicted value $p_{i+5}$, and thus $x_{i+5}$ was set to the observed value $v_{i+5}$, as discussed with respect to 319 or 511. This result was repeated for the next one to many iterations until convergence of the predicted value and the observed value $v_{i+n}$ occurred, at time $t_{i+n}$. The convergence is depicted by showing each of the solid black line (representing the predicted value), the solid black triangle that points upward (representing the observed value), and solid white triangle that points downward (representing $x_{i+n}$) all co-located at a metric value corresponding to time-stamp $t_{i+n}$. The training data $\tilde{X}$ and time-series model were updated at each such iteration, thereby providing updated predicted values, upper and lower failure thresholds, and upper and lower expected thresholds for the subsequent iterations, which facilitates the convergence. If there is no adaptation, say $x_i=(t_i, p_i)$ rather than using some value between the observed value $v_i$ and $p_i$, then the training data $\tilde{X}$ and the subsequent predictions will always be roughly the same as the proceeding training data, and consequently never converge to the real value.

FIGS. 7a-d graphically illustrate another example of how the methodology of FIG. 3 updates the time-series model in response to observed metric data of a new server, in accordance with an embodiment of the present disclosure. As can be seen, a new server 203 is being added to a group of servers 202. The previous discussion with reference to FIG. 4 with respect to how the initial training data $\tilde{X}$ is derived at 306 based on historical data of servers 202, is equally applicable here. To this end, the initial training data $\tilde{X}$ is set to $\{\tilde{X}_0, \tilde{X}_1, \ldots \tilde{X}_{i+1}\}$, and i is initialized to L.

Figure 7A:
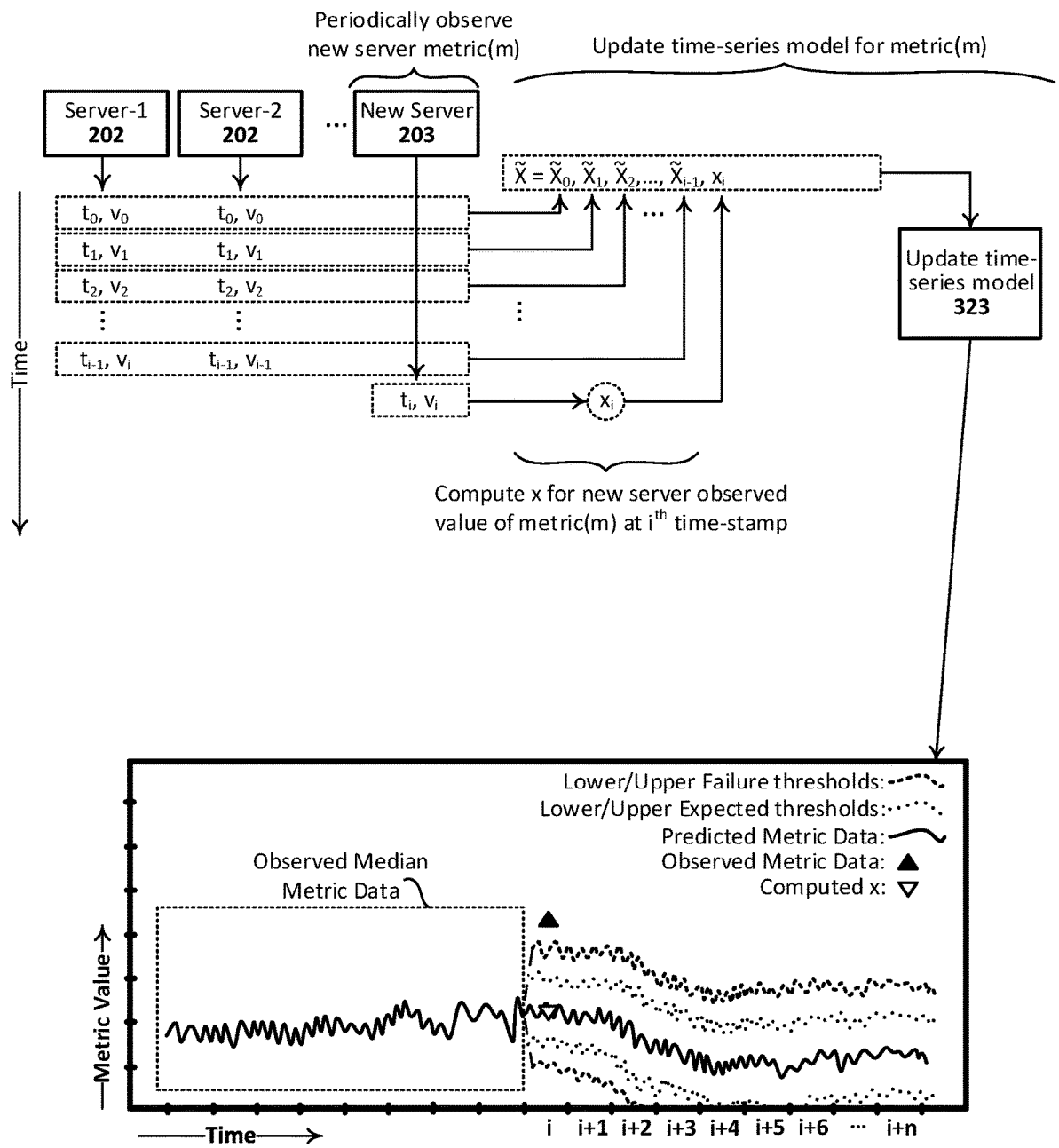
FIGS. 7*a-d* graphically illustrate another example of how the methodology of FIG. 3 or 5 updates the time-series model in response to observed metric data of a new server, in accordance with an embodiment of the present disclosure.
Figure 7B:
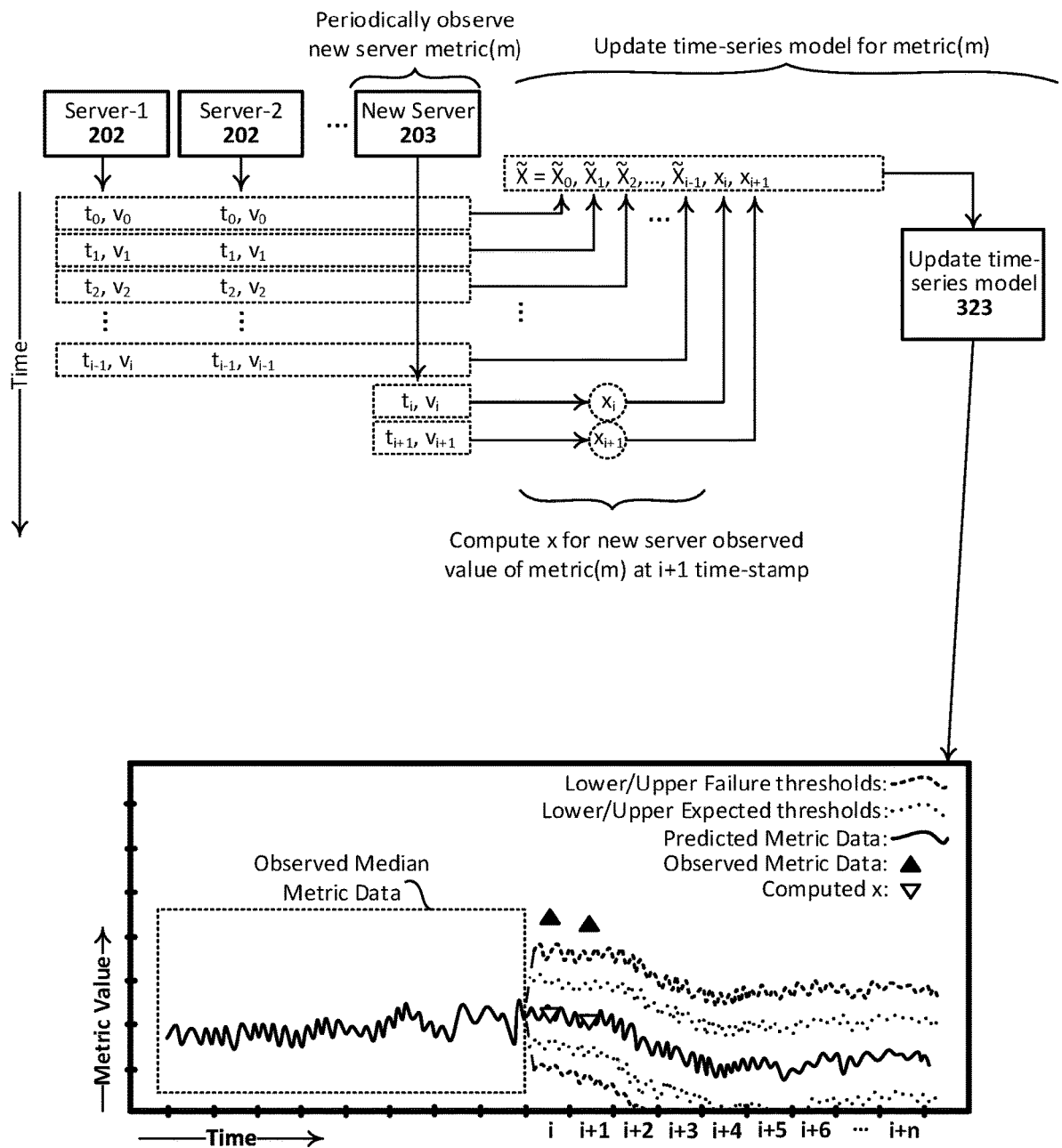

So, and with reference to FIG. 7a, the addition of server 203 to the data center is detected and the metric(m) of the server is observed. As can be seen in the graph on the bottom FIG. 7a, the value $v_i$ of the target metric, as presently observed at time $t_i$ for the added server 203 is outside the failure threshold, as depicted with a solid black triangle that points upward. Thus, the observed value $v_i$ is ignored and $x_i$ is set to the predicted value $p_i$ and the corresponding time stamp $t_i$, and a fault or maintenance can be signaled as indicated at 313 or 507. This value $x_i$ is designated in the graph on the bottom of FIG. 7a as a solid white triangle that points downward. The predicted value $p_i$ is on the solid black line at time L. FIG. 7b shows the result for the next iteration i+1, which is the same as the first iteration. So, the value $v_{i+1}$ of the target metric, as observed at time $t_{i+1}$ for the added server 203 is outside the failure threshold, as depicted with a second solid black triangle that points upward. Thus, the observed value $v_{i+1}$ is ignored and $x_{i+1}$ is set to the predicted value $p_{i+1}$ and the corresponding time stamp $t_{i+1}$, and a fault or maintenance can be signaled as indicated at 313 or 507. This value $x_{i+1}$ is designated in the graph on the bottom of FIG. 7a as a second solid white triangle that points downward. The predicted value $p_{i+1}$ is on the solid black line at time $t_{i+1}$. The training data $\tilde{X}$ is updated at 321 or 515 to include the resulting value for $x_i$, and the time-series model is updated at 323 or 517 using the updated training data $\tilde{X}$. Note that subsequent predicted values, upper and lower failure thresholds, and upper and lower expected thresholds can change with each iteration of the model, based on the last addition of $x_i$ to training data $\tilde{X}$.

Figure 7C:
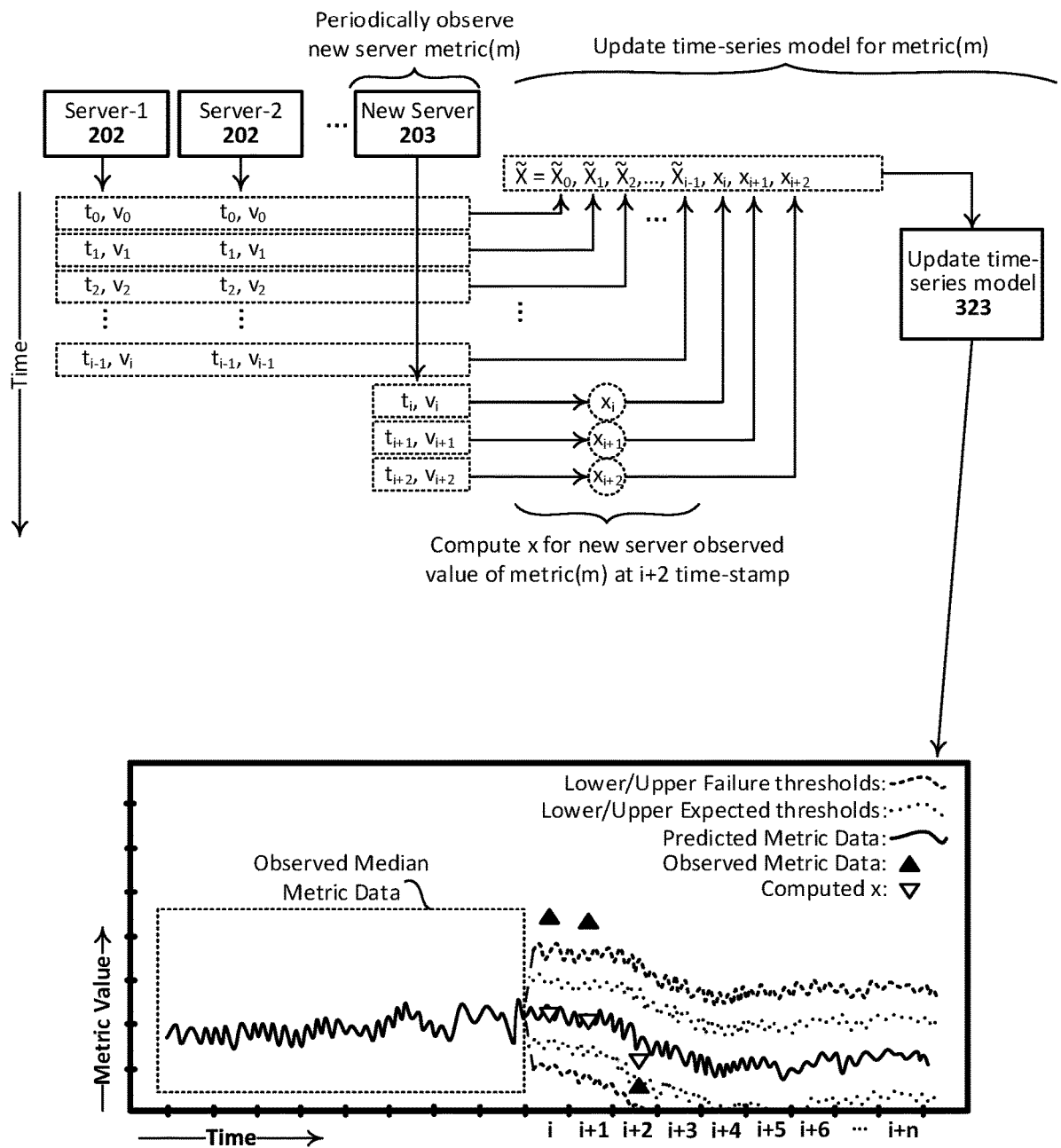

FIG. 7c shows the example process repeating the observation and analysis of metric(m) at the next time-stamp, i+2. As can be seen, the issue with server 203 was addressed, and the observed value $v_{i+2}$ of the target metric, as observed at time $t_{i+2}$ is now within the failure threshold but outside the expected threshold, as depicted with a third solid black triangle that points upward. Thus, $x_{i+2}$ is set to a value between the observed value $v_{i+2}$ and the predicted value $p_{i+2}$ and the corresponding time stamp $t_{i+2}$, as indicated at 317 (e.g., $x_{i+2}=[t_{i+2}, p_{i+2}+\text{sign}(v_{i+2}\ p_{i+2})*\gamma*\sigma_{i+2}]$, as indicated at 513). This value $x_{i+2}$ is designated in the graph on the bottom of FIG. 7c as a second solid white triangle that points downward. The predicted value $p_{i+2}$ is on the solid black line at time $t_{i+2}$. The training data $\tilde{X}$ is updated at 321 or 515 to include the resulting value for $x_{i+2}$, and the time-series model is again updated at 323 or 517 using the updated training data $\tilde{X}$, thereby providing updated predicted values, upper and lower failure thresholds, and upper and lower expected thresholds for the next iteration.

Figure 7D:
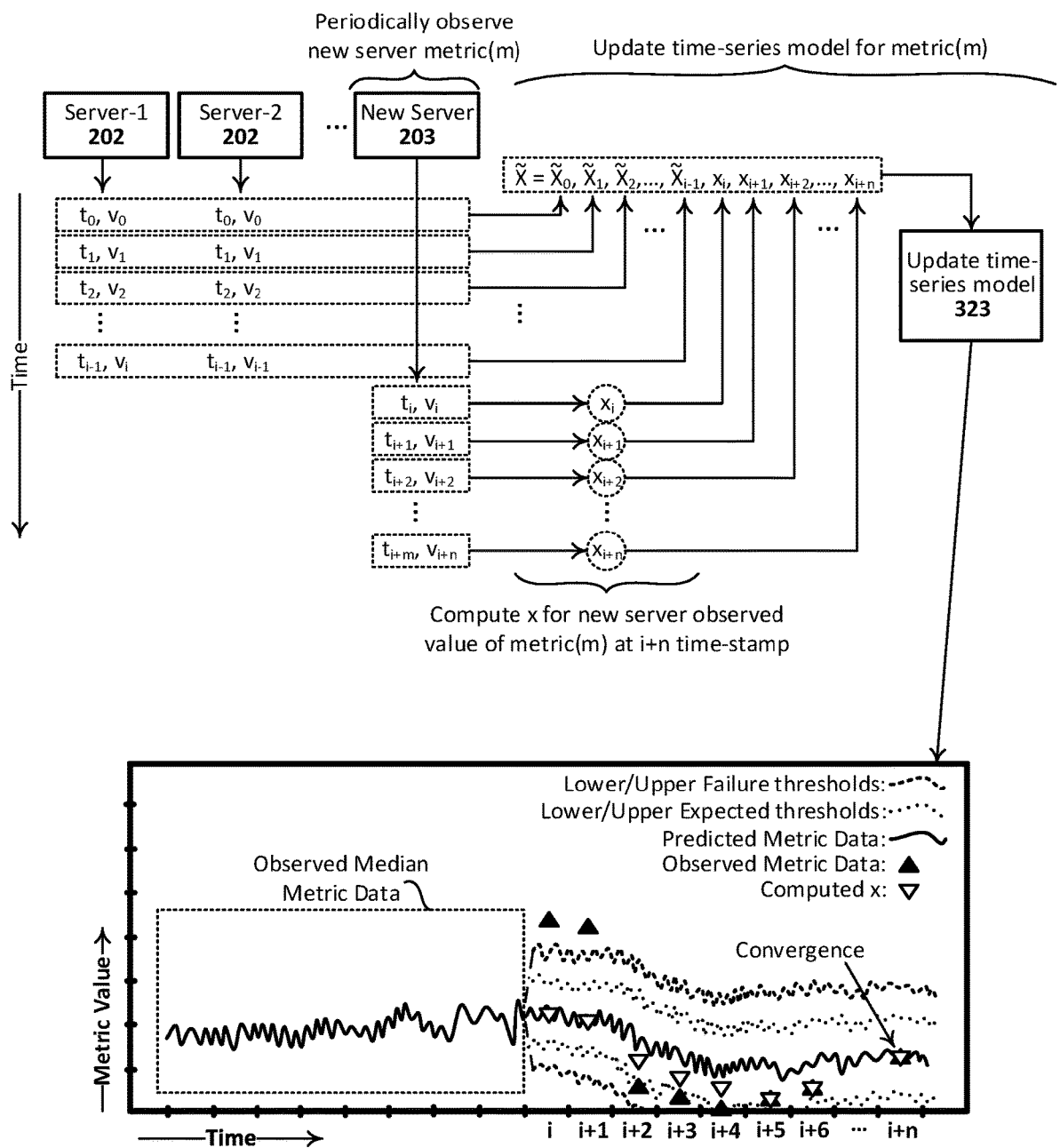

FIG. 7d shows example results after i+n iterations of the process which culminated in convergence of the predicted value $p_{i+n}$ and the observed value $v_{i+n}$, at time $t_{i+n}$. As can be seen, the target metric values $v_{i+3}$ and $v_{i+4}$ observed at times $t_{i+3}$ and $t_{i+4}$, respectively, were within the failure threshold but outside the expected threshold, as depicted with a third solid black triangle that points upward. Thus, the corresponding x values ($x_{i+4}$ and $x_{i+5}$) were each set to a value between the corresponding observed and predicted values, as designated with solid white triangles that point downward, discussed with respect to 317 or 513. At timestamp $t_{i+5}$, the observed value $v_{i+5}$ was within the expected tolerance of the predicted value $p_{i+5}$, and thus $x_{i+5}$ was set to the observed value $v_{i+5}$, as discussed with respect to 319 or 511, and the black triangle is collocated with the white triangle on the plot. As similar result was repeated for the next one to many iterations until convergence of the predicted value $p_{i+n}$ and the observed value $v_{i+n}$ occurred, at time $t_{i+n}$. The previous discussion of FIG. 6d and with respect to convergence is equally applicable here.

FURTHER EXAMPLE EMBODIMENTS

Example 1 includes a method for monitoring server performance. The method includes: build a time-series model for predicting the value of a server metric, the model built using the median value of the server metric at each of a plurality of time-stamps, the time-stamps including a first time-stamp and a last time-stamp, each median value of the server metric based on previously measured values of the server metric from a plurality of servers, the time-series model including a predicted value of the server metric after the last time-stamp. For an additional server added to the plurality of servers, the method includes observe the value of the server metric and compare the observed value of the server metric to the predicted value. In response to the observed value of the server metric being outside a tolerance range about the predicted value, the method includes set x equal to a value between the observed value of the server metric and the predicted value. In response to the observed value of the server metric being within the tolerance range about the predicted value, the method includes set x equal to the observed value of the server metric. The method includes update the time-series model based on x, to provide an updated time-series model to observed value of the additional server.

Example 2 includes the subject matter of Example 1, wherein prior to building the time-series model, the method includes: at each of a plurality of times, measure the value of the server metric for each server of the plurality of servers thereby providing the previously measured values of the server metric, each of the times associated with a time-stamp; and compute the median value of the server metric at each time-stamp, based on the measured values of the server metric from servers of the plurality, thereby providing initial training data having L entries for a time period that extends from the first time-stamp to the last time-stamp, each of the L entries including (1) one of the computed median values of the server metric and (2) a corresponding time-stamp; wherein the time-series model is built using the initial training data.

Example 3 includes the subject matter of Example 1 or 2, wherein the method includes, for the additional server, periodically further observe the value of the server metric at each of a plurality of subsequent times. For each further observed value, the method includes: compare the further observed value of the server metric to a corresponding predicted value included in the updated time-series model; in response to the further observed value of the server metric being outside a tolerance range about the corresponding predicted value, set x equal to a value between the further observed value of the server metric and the corresponding predicted value; in response to the further observed value of the server metric being within the tolerance range about the corresponding predicted value, set x equal to the further observed value of the server metric; and update the updated time-series model based on x.

Example 4 includes the subject matter of any of the preceding Examples, wherein the median value of the server metric at each of a plurality of time-stamps provides training data, the training data initially having L entries for a time period that extends from the first time-stamp to the last time-stamp, each of the L entries including (1) a corresponding one of the median values of the server metric and (2) a corresponding time-stamp. The time-series model is built using the training data, and setting x equal to a value between the observed value of the server metric and the predicted value includes: compute the difference between the observed value of the server metric and the predicted value; initialize i to L; compute a regularizing factor that approaches zero as i increases; determine standard deviation based on the training data; compute an adjustment value based on the difference, regularizing factor, and standard deviation; and add the adjustment value to the predicted value to obtain the value between the observed value and the predicted value.

Example 5 includes the subject matter of Example 4, wherein the regularizing factor is 1 when i is equal to L.

Example 6 includes the subject matter of Example 4 or 5, wherein the method includes, for the additional server, periodically further observe the value of the server metric at each of a plurality of subsequent times. For each further observed value, the method includes: increment i by one and compare the further observed value of the server metric to a corresponding predicted value included in the updated time-series model; in response to the further observed value of the server metric being outside a tolerance range about the corresponding predicted value, set x equal to a value between the further observed value of the server metric and the corresponding predicted value; in response to the further observed value of the server metric being within the tolerance range about the corresponding predicted value, set x equal to the further observed value of the server metric; and update the updated time-series model based on x.

Example 7 includes the subject matter of any of the preceding Examples, wherein the median value of the server metric at each of a plurality of time-stamps provides training data, the training data having L entries for a time period that extends from the first time-stamp to the last time-stamp, each of the L entries including (1) a corresponding one of the median values of the server metric and (2) a corresponding time-stamp, and updating the time-series model based on x includes: update the training data by adding x to the training data, thereby increasing the number of entries of the training data from L to L+1, the L+1 entry including x and a corresponding time-stamp that is after the last time-stamp; and update the time-series model using the updated training data.

Example 8 includes the subject matter of any of the preceding Examples, and the method includes, in response to the observed value of the server metric being outside a failure threshold about the predicted value, signal a fault.

Example 9 includes the subject matter of any of the preceding Examples, wherein the plurality of servers are in a same data center.

Example 10 is a system for monitoring server performance. The system includes: a storage including instructions and one or more processors configured to execute the instructions to: at each of a plurality of times, measure the value of a server metric for each of a plurality of servers, each of the times associated with a time-stamp; compute the median value of the server metric at each time-stamp, based on the measured values of the server metric from servers of the plurality, thereby providing initial training data for a time period that extends from a first time-stamp to a last time-stamp; build a time-series model using the initial training data, the time-series model including a predicted value of the server metric at a time after the last time-stamp; for an additional server added to the plurality of servers, observe the value of the server metric; compare the observed value of the server metric to the predicted value of the time-series model; in response to the observed value of the server metric being outside a tolerance range about the predicted value, set x equal to a value between the observed value of the server metric and the predicted value; in response to the observed value of the server metric being within the tolerance range about the predicted value, set x equal to the observed value of the server metric; update the initial training data to include x to provide updated training data; and update the time-series model using the updated training data.

Example 11 includes the subject matter of Example 10, wherein the initial training data initially has L entries for a time period that extends from the first time-stamp to the last time-stamp, each of the L entries including (1) a corresponding one of the median values of the server metric and (2) a corresponding time-stamp, and updating the initial training data to include x includes increasing the L entries by one, such that the L+1 entry of the updated training data includes x and a corresponding time-stamp.

Example 12 is a computer program product including one or more non-transitory machine-readable mediums encoded with instructions that when executed by one or more processors cause a process to be carried out for monitoring server performance, the process comprising: build a time-series model for predicting the value of a server metric, the model built using initial training data, the initial training data including the median value of the server metric at each of a plurality of time-stamps, the time-stamps including a first time-stamp and a last time-stamp, each median value of the server metric based on previously measured values of the server metric from a plurality of servers, the time-series model including a predicted value of the server metric after the last time-stamp; for an additional server added to the plurality of servers, observe the value of the server metric; compare the observed value of the server metric to the predicted value of the time-series model; in response to the observed value of the server metric being within a failure tolerance but outside an expected tolerance, set x equal to a value between the observed value of the server metric and the predicted value; in response to the observed value of the server metric being within the expected tolerance, set x equal to the observed value of the server metric; update the initial training data to include x to provide updated training data; and update the time-series model using the updated training data, to provide an updated time-series model.

Example 13 includes the subject matter of Example 12, wherein the initial training data has L entries for a time period that extends from the first time-stamp to the last time-stamp, each of the L entries including (1) a corresponding one of the median values of the server metric and (2) a corresponding time-stamp, and updating the initial training data to include x includes increasing the L entries by one, such that the L+1 entry of the updated training data includes x and a corresponding time-stamp.

Example 14 includes the subject matter of Example 12 or 13, wherein prior to building the time-series model, the process includes: at each of a plurality of times, cause measurement of the value of the server metric for each server of the plurality of servers thereby providing the previously measured values of the server metric, each of the times associated with a time-stamp; and compute the median value of the server metric at each time-stamp, based on the measured values of the server metric from servers of the plurality, thereby providing the initial training data with L entries for a time period that extends from the first time-stamp to the last time-stamp, each of the L entries including (1) one of the computed median values of the server metric and (2) a corresponding time-stamp.

Example 15 includes the subject matter of any of Examples 10 through 14, wherein the process includes, for the additional server, periodically further observe the value of the server metric at each of a plurality of subsequent times. For each further observed value, the process continues with: compare the further observed value of the server metric to a corresponding predicted value of the updated time-series model; in response to the further observed value of the server metric being outside a failure tolerance about the corresponding predicted value, signal a fault; in response to the further observed value of the server metric being within the failure tolerance but outside an expected tolerance about the corresponding predicted value, set x equal to a value between the further observed value of the server metric and the corresponding predicted value; in response to the further observed value of the server metric being within the expected tolerance, set x equal to the further observed value of the server metric; update the updated training data to include x to provide further updated training data; and update the updated time-series model using the further updated training data.

Example 16 includes the subject matter of any of Examples 10 through 15, wherein the initial training data has L entries for a time period that extends from the first time-stamp to the last time-stamp, each of the L entries including (1) a corresponding one of the median values of the server metric and (2) a corresponding time-stamp, and wherein setting x equal to a value between the observed value of the server metric and the predicted value includes: compute the difference between the observed value of the server metric and the predicted value; initialize i to L; compute a regularizing factor that approaches zero as i increases; determine standard deviation based on the initial training data; compute an adjustment value based on the difference, regularizing factor, and standard deviation; and add the adjustment value to the predicted value to obtain the value between the observed value and the predicted value.

Example 17 includes the subject matter of Example 16, wherein the regularizing factor is 1 when i is equal to L.

Example 18 includes the subject matter of Examples 16 or 17, wherein the process includes, for the additional server, periodically further observe the value of the server metric at each of a plurality of subsequent times. For each further observed value, the process includes: increment i by one; compare the further observed value of the server metric to a corresponding predicted value included in the updated time-series model; in response to the further observed value of the server metric being outside a tolerance range about the corresponding predicted value, set x equal to a value between the further observed value of the server metric and the corresponding predicted value; in response to the further observed value of the server metric being within the tolerance range about the corresponding predicted value, set x equal to the further observed value of the server metric; and update the updated time-series model based on x.

Example 19 includes the subject matter of any of Examples 12 through 18, wherein in response to the observed value of the server metric being outside the failure tolerance, the process includes signal a fault.

Example 20 includes the subject matter of any of Examples 12 through 19, wherein the plurality of servers are in a same data center.

The foregoing description of example embodiments of the present disclosure has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto.

What is claimed is:

1. A method for monitoring server performance, the method comprising:
building a time-series model using initial training data that includes a median value of a server metric at each of a plurality of time-stamps, the time-stamps including a first time-stamp and a last time-stamp, each median value of the server metric based on previously measured values of the server metric from a plurality of servers, the time-series model being configured to predict a predicted value of the server metric after the last time-stamp, the initial training data having L entries for a time period that extends from the first time-stamp to the last time-stamp;
for an additional server added to the plurality of servers, observing an observed value of the server metric;
comparing the observed value of the server metric to the predicted value;
in response to the observed value of the server metric being outside an expected tolerance range about the predicted value, setting x equal to a value between the observed value of the server metric and the predicted value by:
initializing i to L,
computing a regularizing factor that approaches zero as i increases,
determining a standard deviation based on the initial training data,
computing an adjustment value based on the regularizing factor and the standard deviation, and
adding the adjustment value to the predicted value to obtain x; and
updating the time-series model based on x, to provide an updated time-series model.

2. The method of claim 1,
wherein prior to building the time-series model, the method includes determining a value of the server metric at a particular one of the plurality of servers,
wherein the particular server is associated with a corresponding one or more processors, wherein the value of the server metric is determined using the corresponding one or more processors associated with the particular server, and
wherein the corresponding one or more processors associated with the particular server are configured to evaluate the server metric for the particular server at each of the plurality of time-stamps.

3. The method of claim 1, comprising:
for the additional server, periodically further observing a further observed value of the server metric at each of a plurality of subsequent times; and
for each further observed value:
comparing the further observed value of the server metric to a corresponding predicted value included in the updated time-series model;
in response to the further observed value of the server metric being outside the expected tolerance range about the corresponding predicted value, setting x equal to a value between the further observed value of the server metric and the corresponding predicted value;
in response to the further observed value of the server metric being within the expected tolerance range about the corresponding predicted value, setting x equal to the further observed value of the server metric; and
updating the updated time-series model based on x.

4. The method of claim 1, each of the L entries including (1) a particular one of the median values of the server metric and (2) a time-stamp corresponding to the particular median value.

5. The method of claim 1, wherein the regularizing factor is 1 when i is equal to L.

6. The method of claim 1, comprising:
for the additional server, periodically further observing a further observed value of the server metric at each of a plurality of subsequent times; and
for each further observed value:
comparing the further observed value of the server metric to a corresponding predicted value included in the updated time-series model;
in response to the further observed value of the server metric being outside a failure tolerance about the corresponding predicted value, signaling a fault;
in response to the further observed value of the server metric being within the failure tolerance but outside the expected tolerance range about the corresponding predicted value, setting x equal to a value between the further observed value of the server metric and the corresponding predicted value;
in response to the further observed value of the server metric being within the expected tolerance range about the corresponding predicted value, setting x equal to the further observed value of the server metric; and
updating the updated time-series model based on x.

7. The method of claim 1, each of the L entries including (1) a particular one of the median values of the server metric and (2) a time-stamp corresponding to the particular median value, and wherein updating the time-series model based on x includes:
generating updated training data by adding x to the initial training data, thereby increasing a number of entries of the initial training data from L to L+1, the L+1 entry including x and a corresponding time-stamp that is after the last time-stamp; and
updating the time-series model using the updated training data.

8. The method of claim 1, comprising: in response to the observed value of the server metric being outside a failure threshold about the predicted value, signaling a fault.

9. The method of claim 1, wherein the plurality of servers are in a same data center.

10. A system for monitoring server performance, the system comprising:
a storage including instructions; and
one or more processors configured to execute the instructions to:
at each of a plurality of time-stamps, determine a value of a server metric for each of a plurality of servers;
compute a median value of the server metric at each of the plurality of time-stamps, thereby providing initial training data having L entries for a time period that extends from a first time-stamp to a last time-stamp;
build a time-series model using the initial training data, the time-series model being configured to predict a predicted value of the server metric after the last time-stamp;
for an additional server added to the plurality of servers, observe an observed value of the server metric;
compare the observed value of the server metric to the predicted value of the time-series model;
in response to the observed value of the server metric being outside a tolerance range about the predicted value, set x equal to a value between the observed value of the server metric and the predicted value by:
initializing i to L,
computing a regularizing factor that approaches zero as i increases,
determining a standard deviation based on the initial training data,
computing an adjustment value based on the regularizing factor and the standard deviation, and
using the adjustment value to modify the predicted value to obtain x;
update the initial training data to include x to provide updated training data; and
update the time-series model using the updated training data.

11. The system of claim 10, each of the L entries including (1) a particular one of the median values of the server metric and (2) a time-stamp corresponding to the particular median value.

12. A computer program product including one or more non-transitory machine-readable media encoded with instructions that when executed by one or more processors cause a process to be carried out for monitoring server performance, the process comprising:
building a time-series model for predicting a value of a server metric, the model built using initial training data, the initial training data including a median value of the server metric at each of a plurality of time-stamps, the time-stamps including a first time-stamp and a last time-stamp, each median value of the server metric based on previously measured values of the server metric from a plurality of servers, the time-series model including a predicted value of the server metric after the last time-stamp, the initial training data having L entries for a time period that extends from the first time-stamp to the last time-stamp;
for an additional server added to the plurality of servers, observing a value of the server metric;
comparing the observed value of the server metric to the predicted value of the time-series model;
in response to the observed value of the server metric being within a failure tolerance but outside an expected tolerance, setting x equal to a value between the observed value of the server metric and the predicted value by:
  initializing i to L,
  computing a regularizing factor that approaches zero as i increases,
  determining a standard deviation based on the initial training data,
  computing an adjustment value based on the regularizing factor and the standard deviation, and
  adding the adjustment value to the predicted value to obtain the value between the observed value and the predicted value;
in response to the observed value of the server metric being within the expected tolerance, setting x equal to the observed value of the server metric;
updating the initial training data to include x to provide updated training data; and
updating the time-series model using the updated training data, to provide an updated time-series model.

13. The computer program product of claim 12, wherein each of the L entries includes (1) a corresponding one of the median values of the server metric and (2) a corresponding time-stamp, and wherein updating the initial training data to include x includes increasing the L entries by one, such that the L+1 entry of the updated training data includes x and a corresponding time-stamp.

14. The computer program product of claim 12, wherein prior to building the time-series model, the process includes:
  at each of a plurality of times, causing measurement of a value of the server metric for each server of the plurality of servers thereby providing the previously measured values of the server metric, each of the times associated with a time-stamp; and
  computing the median value of the server metric at each time-stamp, based on the measured values of the server metric from servers of the plurality, each of the L entries including (1) one of the computed median values of the server metric and (2) a corresponding time-stamp.

15. The computer program product of claim 12, the process comprising:
  for the additional server, periodically further observing a value of the server metric at each of a plurality of subsequent times; and
  for each further observed value:
    comparing the further observed value of the server metric to a corresponding predicted value of the updated time-series model;
    in response to the further observed value of the server metric being outside the failure tolerance about the corresponding predicted value, signaling a fault;
    in response to the further observed value of the server metric being within the failure tolerance but outside the expected tolerance about the corresponding predicted value, setting x equal to a value between the further observed value of the server metric and the corresponding predicted value;
    in response to the further observed value of the server metric being within the expected tolerance, setting x equal to the further observed value of the server metric;
    updating the updated training data to include x to provide further updated training data; and
    updating the updated time-series model using the further updated training data.

16. The computer program product of claim 12, each of the L entries including (1) a corresponding one of the median values of the server metric and (2) a corresponding time-stamp.

17. The computer program product of claim 12, wherein the regularizing factor is 1 when i is equal to L.

18. The computer program product of claim 12, the process comprising:
  for the additional server, periodically further observing a value of the server metric at each of a plurality of subsequent times; and
  for each further observed value:
    incrementing i by one;
    comparing the further observed value of the server metric to a corresponding predicted value included in the updated time-series model;
    in response to the further observed value of the server metric being outside a tolerance range about the corresponding predicted value, setting x equal to a value between the further observed value of the server metric and the corresponding predicted value;
    in response to the further observed value of the server metric being within the tolerance range about the corresponding predicted value, setting x equal to the further observed value of the server metric; and
    updating the updated time-series model based on x.

19. The computer program product of claim 12, the process comprising:
  in response to the observed value of the server metric being outside the failure tolerance, signaling a fault.

20. The computer program product of claim 12, wherein the plurality of servers are in a same data center.

* * * * *